United States Patent [19]
Kameyama et al.

[11] Patent Number: 5,661,572
[45] Date of Patent: Aug. 26, 1997

[54] AUTOMATIC SHEET CONVEYING MECHANISM

[75] Inventors: Shinji Kameyama; Takeo Yoshihiro; Yoshiki Aoyama; Shuichi Akedo; Masayuki Mizuno, all of Osaka, Japan

[73] Assignee: Mita Industrial Co., Ltd., Japan

[21] Appl. No.: 456,470

[22] Filed: Jun. 1, 1995

Related U.S. Application Data

[62] Division of Ser. No. 88,387, Jul. 9, 1993, Pat. No. 5,442,466.

[30] Foreign Application Priority Data

Jul. 13, 1992 [JP] Japan .................................. 4-185547
Jul. 13, 1992 [JP] Japan .................................. 4-209715

[51] Int. Cl.$^6$ ........................................ H04N 1/00
[52] U.S. Cl. ................................ 358/498; 358/496
[58] Field of Search ........................ 358/400, 474, 358/496, 498; 355/308, 309, 316–318; H04N 1/00

[56] References Cited

U.S. PATENT DOCUMENTS

| | | |
|---|---|---|
| 4,754,337 | 6/1988 | Nobtomi et al. . |
| 4,895,288 | 1/1990 | Kotani et al. . |
| 5,274,477 | 12/1993 | Mori et al. ................................ 358/498 |
| 5,311,330 | 5/1994 | Yeh ............................................ 358/498 |
| 5,327,250 | 7/1994 | Ikeda ........................................ 358/498 |
| 5,475,504 | 12/1995 | Ogura et al. ............................. 358/498 |
| 5,504,587 | 4/1996 | Morikawa et al. ...................... 358/498 |

FOREIGN PATENT DOCUMENTS

| | | |
|---|---|---|
| 299437 | 1/1989 | European Pat. Off. . |
| 364827 | 4/1990 | European Pat. Off. . |
| 416596 | 3/1991 | European Pat. Off. . |
| 63-154560 | 6/1988 | Japan . |
| 63-154561 | 6/1988 | Japan . |
| 2-215666 | 8/1990 | Japan . |

*Primary Examiner*—Kim Vu
*Attorney, Agent, or Firm*—Beveridge, Degrandi, Weilacher & Young, LLP

[57] ABSTRACT

In one of aspects of the invention, an automatic sheet conveying mechanism comprises upper and lower casings mutually coupling sheet conveying paths in a releasable state, and a sheet guide plate for partitioning the sheet conveying paths together with the lower casing, guiding the lower surface of the sheet being conveyed, and defining the projecting extent of the functional parts supported by the lower casing into the sheet conveying path, in which the sheet guide plate is formed integrally with the lower casing.

5 Claims, 15 Drawing Sheets

5,661,572

AUTOMATIC SHEET CONVEYING MECHANISM

CROSS REFERENCE TO RELATED APPLICATIONS

This is a divisional of application Ser. No. 08/088,387 filed on Jul. 9, 1993, now U.S. Pat. No. 5,442,466.

This application claims priority benefits under 35 USC §119 of Japanese Patent Application Ser. Nos. 209715/1992 and 185547/1992, filed, respectively, on Jul. 13, 1992, the disclosure of which is incorporated herein by reference.

BACKGROUND OF THE INVENTION

1. Field of the Invention

The present invention relates to an automatic sheet conveying mechanism, and more particularly to an automatic sheet conveying mechanism optimally used as an automatic document conveying mechanism for conveying a plurality of documents in a device, such as facsimile machine, image scanner, or the like.

2. Description of the Related Art

The present invention relates to an automatic sheet conveying mechanism of a facsimile machine or image scanner, wherein the automatic sheet conveying mechanism automatically conveys a plurality of single sheets for, reading images, processing, and stamping (for example, see the Japanese Unexamined Patent Publication No. 2-215666).

An automatic sheet conveying mechanism 1000 in an earlier embodiment in the process of developing the invention is shown in FIG. 1. It comprises a pair of upper casing 1001a and lower casing 1001b divided in upper and lower parts. Each casings 1001a and 1001b are provided with sheet guide plates 1001d and 1002 which are made of separate materials from the corresponding casings 1001a and 1001b. Sheet guide plates 1001d and 1002 partition therebetween a sheet conveying path 1003 to convey sheets between the sheet guides 1001d and 1002, a sheet insertion port 1004 opened upstream of the sheet conveying path, and a sheet discharge port 1005 downstream of the sheet conveying path.

The sheet conveying path 1003 is composed of a lead-in part 1003a for leading the sheet inserted from the sheet insertion port 1004, a bent part 1003b bent downward from the lead-in part 1003a, and a processing part 1003c extending toward the discharge port 1005 which is integral with the bent part 1003b. Lead-in part 1003a has a sufficient width for inserting a plurality of sheets.

In the sheet conveying path 1003, sheet forward feed means 1006 disposed at the lead-in part 1003a, separating conveying means 1007 disposed in the bent part 1003b, sheet conveying means 1008 disposed in the processing part 1003c, a contact type image sensor 1009, and sheet discharge means 1010 are sequentially disposed.

The sheet forward feed means 1006 is for feeding forward the sheet disposed in the lead-in part 1003a to the downstream side, and is furnished with a forward feed roller 1006a confronting the lead-in part 1003a of the sheet conveying path 1003 from the lower casing 1001b. Above the forward feed roller 1006a, a pressing member 1006b is confronting the lead-in part 1003a of the sheet conveying path 1003 from the upper casing 1001a, being supported by the upper casing 1001a in a state free to move forward and backward in the confronting direction. The pressing member 1006b has a flat pressure bearing surface b1. On this flat pressure bearing surface b1, one extension spring member 1006c is stretched in a direction approximately orthogonal to the sheet conveying direction, with the both ends fixed on the upper casing 1001a. The pressing member 1006b is thrust to the forward feed roller 1006a side by this one extension spring member 1006c, and by this thrusting force, the sheet fed into the lead-in part 1003a is held together with the forward feed roller 1006a. In this state, by further rotating the forward feed roller 1006a, the sheet fed into the lead-in part 1003a is sent to the bent part 1003b at the downstream side.

The separating conveying means 1007 disposed in the bent part 1003b is provided with sheet conveying roller 1007a. The sheet conveying roller 1007a is confronting the bent part 1003b of the sheet conveying path 1003 from the sheet conveying roller 1007a. Above the sheet conveying roller 1007a is confronting a separating member 1007b projecting to the bent part 1003b of the sheet conveying path 1003 from the upper casing 1001a. The separating member 1007b is thrust to the sheet conveying roller 1007a side by a spring member 1007c. Furthermore, the separating member 1007b, in order to separate the sheets one by one, is provided with a separating part 1007d projecting into the sheet conveying roller 1007a for pressing the sheet together with the sheet conveying roller 1007a, and a pad 1007e confronting the sheet conveying roller 1007a as being disposed opposite to the separating part 1007d, and by this separating part 1007d, the end of the sheet fed into the lead-in part 1003a is separated obliquely so that the upper end side may be inclined to the upstream side, while only the lowermost sheet is held between the pad 1007e and sheet conveying roller 1007a by the thrusting force of the spring member 1007c. In this state, by rotating the sheet conveying roller 1007a, only the lowermost one of the sheets from the lead-in part 1003a is sent into the processing part 1003c at the downstream side from the bent part 1003b. In this constitution, the separating direction by the separating member 1007b of the separating conveying means 1007 is intersecting with the conveying direction of the sheet conveying means 1008, and therefore multiple feed is prevented, and only the lowermost sheet can be conveyed easily.

The sheet conveying means 1008 disposed in the processing part 1003c is to convey the sheets individually separated by the separating conveying means 1007 to the image contact type image sensor 1009 side, and it is provided with a driven roller 1008a disposed on the upper casing 1001a and a driving roller 1008b disposed on the lower casing 1001b. The driving roller 1008b is set so as to rotate at a higher peripheral speed than the sheet conveying roller 1007a, so that joint conveyance of sheets is prevented.

The contact type image sensor 1009 is to separate and scan the image which is the two-dimensional information of the conveyed sheet in every pixel, and comprises a contact type image sensor main body 1009a. The contact type image sensor main body 1009a is fixed to the lower casing 1001b of bolts 1009c through a frame 1009b, and comprises a contact glass 1009d confronting the processing part 1003c. In the conventional apparatus, the contact glass 1009d slightly projects upward from the upper surface of the sheet guide 1002, and in order that the sheet may not be caught on the contact glass 1009d when conveying and moving the sheet, it is furnished with a cut surface 1009e of which upstream side end face is cut obliquely.

The sheet discharge means 1010 is for discharging the sheet being read and processed by the contact type image sensor 1009a into the sheet discharge port 1005, and is composed of a driven roller 1010a mounted on the upper casing 1001a and a driving roller 1010b mounted on the lower casing 1001b.

Thus, in the constitution shown in FIG. 1, the sheet guide plates 1001d, 1002 for partitioning the sheet conveying path 1003 were formed of separate members for the corresponding casings 1001a, 1001b, it was difficult to achieve the positioning precision of the sheet conveying path 1003 with respect to the functional parts for composing the sheet forward feed means 1009, separating and conveying means 1007, sheet conveying means 1008, contact type image sensor 1009, and sheet discharge means 1010, and it was hence difficult to maintain a high performance.

For example, in the case of the lower casing 1001b, due to the effects of assembling precision of the sheet guide plate 1002 and lower casing 1001b, if the sheet guide plate 1001 is sinking too much as compared with the lower casing 1001b, the functional part mounted on the lower casing 1001b is projecting too much into the sheet conveying path 1003, which often resulted in duplicate feed or noise due to deflection of the sheet. On the other hand, if the relative position of the sheet guide plate 1002 to the lower casing 1001b is too high, the functional part mounted on the lower casing 1001b cannot be projected sufficiently into the sheet conveying path 1003, and the sheet conveying capacity is lowered, and the conveying delay may be caused.

Besides, in the constitution in FIG. 1, since the pressing member 1006b is thrust to the forward feed roller 1006a side in the state of laying the extension spring member 1006c over the flat pressure bearing surface b1, although the extension spring member 1006c can be uniformly abutted against the pressing member 1006b, it is difficult to apply the thrusting force of the extension spring member 1006c uniformly over the whole stroke of the pressing member 1006b, or to set the initial load.

More specifically, when the pressure bearing surface b1 is formed flatly, since the edge of the pressure bearing surface b1 slides on the extension spring 1006c, a fluctuation occurs in the thrusting force between the both ends and the middle part of the pressure bearing member b1, and the thrusting state of the extension spring member 1006c to the pressure bearing surface b1 is not stabilized. Accordingly, the initial load hardly settles at the predetermined set value.

Moreover, since the number of sheets fed into the lead-in part 1003a of the sheet conveying path 1003 is always different generally, the stroke in the pressing direction of the pressing member 1006b is set relatively large. Accordingly, by the behavior of the pressing member 1006b in the pressing direction, the fluctuation of thrusting force is emphasized. When such fluctuation of thrusting force occurs, if the thrusting force is excessive, the force for pressing the sheet is too strong, duplicate feed of sheets occurs, or if too weak, the sufficient forward feed force in the case of many sheets cannot be obtained, and delay in conveying occurs.

In the constitution in FIG. 1, by thrusting the pressing member 1006b merely by a single extension spring member 1006c, the sheet fed into the lead-in part 1003a was held between the pressing member 1006b and forward feed roller 1006a, it was extremely difficult to set the thrusting force of the extension spring member 1006c.

Explaining more specifically, the number of sheets fed into the lead-in part 1003a of the sheet conveying path 1003 is always different, and when the number of sheets is large, it is necessary to hold the sheets firmly to obtain a sufficient forward feed driving force, or when the number of sheets is small, it is necessary to hold weakly to prevent duplicate feed.

Therefore, if the thrusting force of the extension spring member 1006c is too strong, when the number of sheets is small, duplicate feed of sheets may occur, and if too weak, when the number of sheets is many, sufficient forward feed force cannot be obtained, and delay in conveying occurs.

Also in the constitution in FIG. 1, in order to convey only the lowermost sheet by preventing duplicate feed, the separating direction by the separating member 1007b of the separating conveying means 1007 is intersecting with the conveying direction by the sheet conveying means 1008, and therefore when the sheet reaches the faster sheet conveying means 1008 than the conveying speed of the sheet conveying roller 1007a and a tension is generated between the sheet conveying roller 1007a and the sheet conveying means 1008, the separating member 1007b may be kicked up by the sheet on which this tension is acting. As a result, duplicate feed of sheets occurs the moment the separating member 1007 is kicked up.

Also in the constitution in FIG. 1, in order to convey only the lowermost sheet by preventing duplicate feed, the separating part 1007d of the separating member 1007b is projecting to the sheet conveying roller 1007a, and the sheet is held against the sheet conveying roller 1007a, and therefore it was extremely difficult to specify the shape of the separating part 1007d of the separating conveying means 1007.

More specifically, when the separating part 1007d is projecting too much to the sheet conveying roller 1007a side, the sheet cannot get in between the two, and conveying failure may occur, or if the projection is too small, a plurality of sheets may be held, and duplicate feed may occur.

Also in the constitution in FIG. 1, since the contact type image sensor main body 1009a is fixed to the lower casing 1001b by the bolt 1009c, frame 1009b, etc., in the case of maintenance or replacement work of the contact type image sensor main body 1009a, it was required to detach the sheet guide plate 1002 from the lower casing 1001b, loosen the bolt 1009c, and dismount the contact type image sensor main body 1009a from the frame 1009b. It hence took much labor in maintenance work, which could not be done by the user alone.

Also in the constitution in FIG. 1, since the cut surface 1009e having the upstream side end face cut obliquely is formed on the contact glass 1009d of the contact type image sensor main body 1009a, the manufacturing cost of the contact glass 1009d was higher. In particular, since the contact type image sensor main body 1009a is relatively high in frequency of replacement, it pushed up the maintenance cost.

Instead of the cut surface 1009e of the contact glass 1009d, a film-like Lumilar may be adhered to the contact glass 1009d, but in this case, the contact type image sensor 1009 must be replaced together with Lumilar, which means also a high maintenance cost.

The invention is devised in the light of the above problems, and it is hence a primary object thereof to present an automatic sheet conveying mechanism capable of setting the projection extent of functional parts into the sheet conveying path precisely, and preventing occurrence of unusual sound or delay in sheet conveyance.

It is also an object of the invention to present an automatic sheet conveying mechanism possessing a precise sheet forward feed function by stabilizing the sheet pressing force when feeding the sheet forward.

It is also an object of the invention to present an automatic sheet conveying mechanism possessing an appropriate sheet forward feed function regardless of the number of sheets.

It is also an object of the invention to present an automatic sheet conveying mechanism capable of preventing duplicate feed of sheets by preventing kick-up of the separating member.

It is also an object of the invention to present an automatic sheet conveying mechanism capable of securely preventing defective conveyance or duplicated feed of sheets in the separating conveying means.

It is also an object of the invention to present an automatic sheet conveying mechanism easy in the maintenance work of contact type image sensor when composing an automatic document conveying mechanism.

It is also an object of the invention to present an automatic sheet conveying mechanism low in the maintenance cost of contact type image sensor when composing an automatic document conveying mechanism.

SUMMARY OF THE INVENTION

In an aspect of the invention, an automatic sheet conveying mechanism comprises:

upper and lower casings having a sheet conveying path mutually linked in a releasable state; and a sheet guide plate partitioning the sheet conveying path together with the lower casing and defining the projection extent of functional parts supported by the lower casing into the sheet conveying path for guiding the lower surface of conveyed sheet, wherein the sheet guide plate is integrally formed with the lower casing.

According to the automatic sheet conveying mechanism in this mode, the positioning precision of the functional parts to the sheet guide plate is determined only by the processing precision when forming the lower casing and the assembling precision of functional parts on the lower casing, the projection extent of the functional parts into the sheet conveying path can be set precisely, so that generation of unusual sounds and delays in conveyance may be prevented.

Also, by forming the sheet guide plate for partitioning the sheet conveying path integrally with the lower casing, the number of parts and the number of assembling steps can be decreased, so that the manufacturing cost may be lowered.

In another preferred mode of the invention, an automatic sheet conveying mechanism comprises:

a casing having a sheet conveying path therein; and sheet forward feed means including a forward feed roller being opposite to a sheet lead-in part of the sheet conveying path in the casing, a pressing member being confronted with the forward feed roller in a direction intersecting a sheet conveying direction and adapted to grip the sheet fed into the sheet leadin part together with the forward feed roller by reciprocating in a direction in which the pressing member is confronted with the forward feed roller, extension spring means having opposite ends fixed to the casing so as to bias the pressing member in a direction in which the pressing member presses the sheets, and a pressure bearing surface formed on the pressing member so as to stretch the extension spring means in a position approximately orthogonal to the sheet conveying direction, thereby pressing the sheet fed into the lead-in part of the sheet conveying path to feed downstream of the sheet conveying path, wherein the pressure bearing surface of the pressing member is formed in a round shape having projecting part formed at middle portion in a stretching direction of the extension spring means.

According to the automatic sheet conveying mechanism in the mode, regardless of the behavior of the pressing member in the pressing direction, the thrusting force by the extension spring means can be distributed uniformly over the entire pressure bearing surface, and therefore the sheet pressing force in forward feed of the sheet is always stable, so that the sheet forward feed mechanism of high precision is realized.

Another preferred mode of the invention, an automatic sheet conveying mechanism comprises:

a casing having a sheet conveying path therein, and sheet forward feed means including a forward feed roller being opposite to a sheet lead-in part of the sheet conveying path in the casing, a pressing member being confronted with the forward feed roller and adapted to grip the sheet fed into the sheet lead-in part together with the forward feed roller by reciprocating in a direction in which the pressing member is confronted with the forward feed roller, and spring means mounted in the casing so as to bias the pressing member in a direction in which the pressing member presses the sheets, thereby pressing the sheet fed into the lead-in part of the sheet conveying path to feed downstream of the sheet conveying path, wherein the spring means are provided with a first spring member for always biasing the pressing member, and a second spring member for biasing the pressing member together with the first spring member only when the pressed sheets exceed the certain amount.

According to the automatic sheet conveying mechanism in the preferred mode, when the held sheets are few, a weak thrusting force is obtained by the first spring member, and when the held sheets are more than a predetermined number of sheets, a strong thrusting force is obtained by the first and second spring members, and therefore a thrusting force depending on the number of sheets may be easily obtained by varying the specifications of the spring members. Therefore, the invention realizes an appropriate sheet forward feed function regardless of the number of sheets.

In a further different preferred mode of the invention, an automatic sheet conveying mechanism comprises:

a casing composing a sheet conveying path, for conveying sheets, sheet conveying means disposed in the casing for conveying sheets, and separating conveying means disposed at an upstream side of the sheet conveying means in the casing, for separating the sheets in a separating direction intersecting with a conveying direction in which the sheets are conveyed by the sheet conveying means and for conveying a plurality of stacked sheets to the sheet conveying means one by one, wherein the separating conveying means includes a sheet conveying roller coming in contact with the predetermined surface of the sheet, and a separating member adapted to adjust a distance from the sheet conveying roller for bending the sheet in the separating direction along a periphery of the sheet conveying roller in a state of being elastically pressed to an end part of the sheet, the sheet conveying means is driven at a sheet conveying speed which is faster than a sheet conveying speed for the separating conveying means so that the sheet to be conveyed is stretched between the sheet conveying means and the separating conveying means, and the automatic sheet conveying mechanism further comprises guide means provided between the sheet conveying means and the separating and conveying means for guiding the sheet so as to prevent the separating member in the separating direction from being displaced by the sheet stretched between the sheet conveying means and the separating conveying means.

According to the automatic sheet conveying mechanism in the preferred mode, the effect of the tension on the separating means when the tension occurs on the sheet can be eliminated by the guide means, so that kick-up of the separating member can be prevented. Therefore, the invention brings about an outstanding effect of preventing duplicate feed of sheets due to kick-up of the separating member.

In other different preferred mode of the invention, an automatic sheet conveying mechanism comprises:

separating conveying means for separating the sheets fed into a sheet conveying path and conveying one by one, the separating conveying means includes a sheet conveying roller being opposite to the sheet conveying path and a separating part for obliquely separating end faces of the sheets to be conveyed by the sheet conveying roller, wherein the separating part of the separating conveying means is provided with a main separating part for separating a plurality of sheets one by one in cooperation with the sheet conveying roller and a subsidiary separating part disposed at an upstream side of the main separating part for limiting the number of sheets to be supplied in the main separating part.

According to the automatic sheet conveying mechanism in the preferred mode, since the sheet fed into the sheet conveying path is first limited in the predetermined number of pieces by the subsidiary separating leans, and then conveyed to the downstream side one by one by the main separating part, defective conveyance and duplicate feed by the separating conveying means may be securely prevented.

In a further different preferred mode of the invention, an automatic sheet conveying mechanism optimum for automatic document conveying mechanism comprises:

a sheet guide plate partitioning an opening for penetrating a long contact type image sensor for scanning a lower surface of a document conveyed in a sheet conveying path and guiding the lower surface of the document, wherein the sheet guide plate is integrally formed with an accommodating part for accommodating the image sensor in a state of supporting in a predetermined position, and the opening is sized to put therethrough the image sensor in and out of the accommodating part from above the sheet guide plate.

According to the automatic sheet conveying mechanism in the preferred mode, it is not necessary to mount or dismount the sheet guide plate when detaching or attaching the image sensor, so that the maintenance of the image sensor may be easy.

In a still different preferred mode of the invention, a sheet conveying mechanism optimum for automatic document conveying mechanism comprises:

a sheet guide plate partitioning an opening for penetrating a long contact type image sensor for scanning a lower surface of a document conveyed in a sheet conveying path, and guiding a lower surface of the document; and a thin plate for guiding the lower surface of the document on an upper surface of the image sensor from an edge of the image sensor being upstream in a conveying direction in which the document is conveyed so as to prevent the document from colliding with the edge of the image sensor being upstream in the conveying direction, wherein the thin plate lies between a portion of the upper surface of the image sensor being upstream of the conveying direction and a recess adjacent to the portion and formed upstream of the conveying direction in an upper edge surface of the opening in the sheet guide plate, and the thin plate is fixed to the recess at a height capable of preventing the document from colliding with the thin plate.

According to the automatic sheet conveying mechanism in the preferred mode, it is not necessary to replace together with the Lumilar when detaching or attaching the image sensor, so that the maintenance cost of the image sensor may be reduced.

In another different preferred mode of the invention, a sheet conveying mechanism optimum for automatic document conveying mechanism comprises:

a sheet guide plate partitioning an opening for penetrating a long contact type image sensor for scanning a lower surface of a document conveyed in a sheet conveying path, and guiding a lower surface of the document;

a thin plate for guiding the lower surface of the document on an upper surface of the image sensor from an edge of the image sensor being upstream in a conveying direction in which the document is conveyed so as to prevent the document from colliding with the edge of the image sensor being upstream in the conveying direction;

an accommodating part integrally formed with the sheet guide plate for accommodating the image sensor through the opening; and a fixing member having a portion which is accommodated in the accommodating part detachably from above the sheet guide plate for fixing the thin plate.

According to the automatic sheet conveying mechanism in the preferred mode, it is not necessary to replace together with the thin plate when detaching or attaching the image sensor, so that the maintenance cost of the image sensor may be lowered. In addition, since there is a free space adjacent to the image sensor in the accommodating part with the fixing member detached, the image sensor can be easily detached from the image sensor accommodating part, so that the image sensor may be replaced easily.

BRIEF DESCRIPTION OF THE DRAWINGS

Further features, objects and effects of the invention will be better appreciated and understood in the following detailed description taken in conjunction with the accompanying drawings, in which.

DETAILED DESCRIPTION OF THE PREFERRED EMBODIMENTS

Referring now to the attached drawings, preferred embodiments of the invention are described below.

Figure 3:
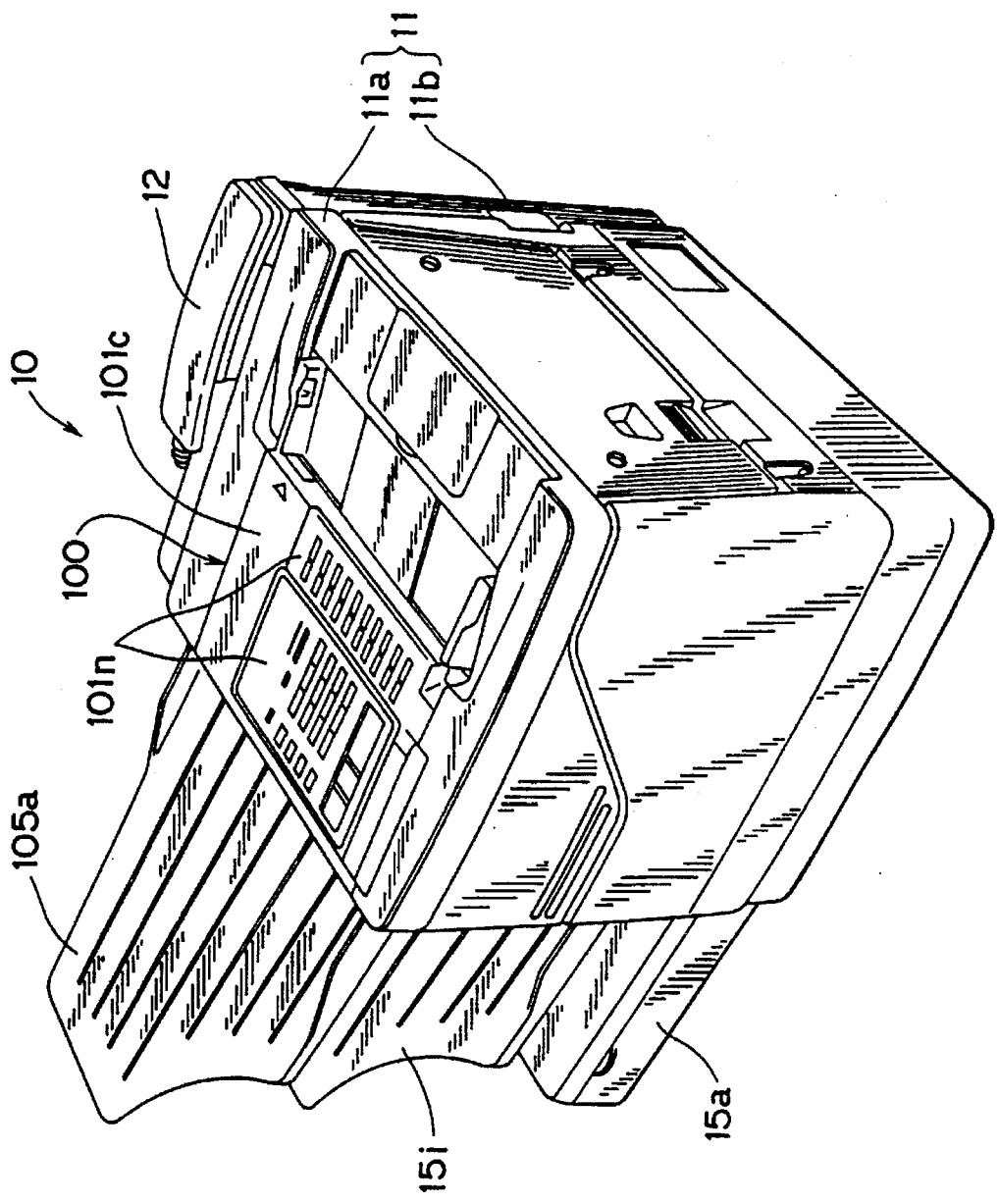
FIG. 3 is a perspective appearance view of a facsimile apparatus employing the automatic sheet conveying mechanism in the embodiment in FIG. 1.
Figure 4:
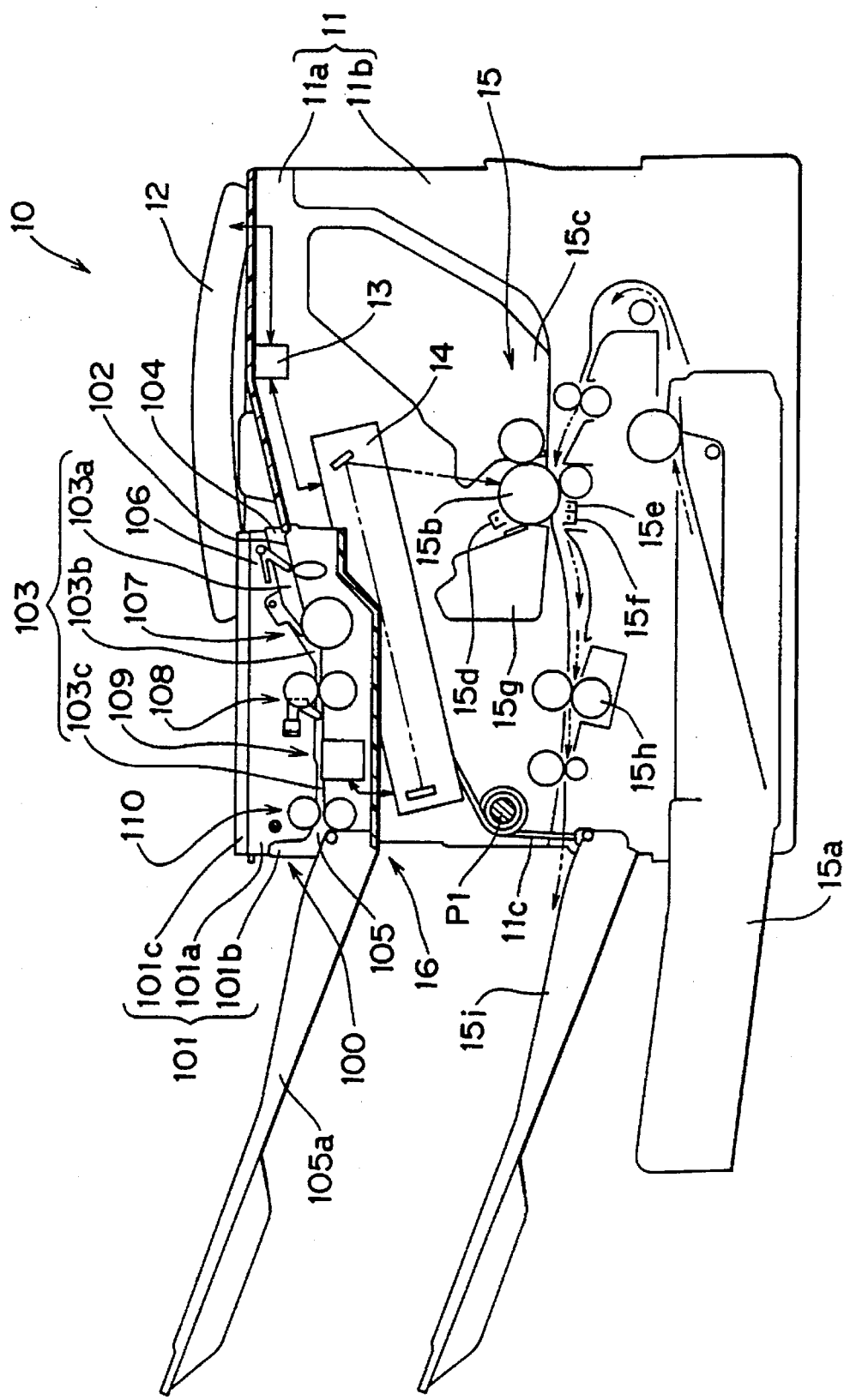
FIG. 4 is a schematic sectional view of a facsimile apparatus employing the automatic sheet conveying mechanism in a first embodiment of the invention.

FIG. 3 is an appearance of a facsimile apparatus 10 employing an automatic sheet conveying mechanism 100 of the invention, and FIG. 4 is a sectional schematic view of the facsimile apparatus 10.

By reference to these drawings, the facsimile apparatus 10 comprises a main body 11 comprising an upper housing 11a, a lower housing 11b for pivoting the upper housing 11a through a pivot P1, and a spring member 11c for thrusting the upper housing 11a in the releasing direction, a telephone set 12 mounted on the main body 11, a modem 13 for modulating or demodulating signals as being connected to the telephone set 12, an optical system 14 including a transmission and reception control unit connected to the modem 13, and transmitting optically converted image information, recording means 15 comprising transfer paper cassette 15a, photosensitive drum 15b, developing device 15c, electric charger 15d, transfer charger 15e, separation charger 15f, cleaning device 15g, fixing device 15h, discharge paper tray 15i, and others for recording the image converted into optical information by the optical system 14 on transfer paper, and transmission means 16 for transmitting the transmission signal to the control unit of the optical system 14. Same as the general facsimile apparatus, in the reception process, the image information is received from the facsimile at the sending side through the telephone set 12 and it is demodulated in the optical system 14, and is further decoded, and the image information is recorded by the recording means 15, whereas in the transmission process, the image information of the sheet is converted into an electric signal by the transmission means 16, and further coded and modulated into a transmission signal to be sent to the facsimile apparatus at the receiving side. In the facsimile apparatus 10 of the embodiment, meanwhile, by transmitting the transmission signal from the transmission means 16 to the recording means 15, it is possible to set to obtain a hard copy of the sheet.

An automatic sheet conveying mechanism 100 of the invention composes a principal block of the transmission means 16.

The automatic sheet conveying mechanism 100 comprises a casing 101 mounted on the housing 11a of the main body 11, a sheet guide plate 102 disposed in the casing 101 to guide the lower surface of the conveyed sheet, a sheet conveying path 103 having a part partitioned by the sheet guide plate 102, a sheet insertion port 104 formed at the upstream end of the sheet conveying path 103, and a sheet discharge port 105 formed at the downstream end of the sheet conveying path 103.

The sheet conveying path 103 is composed of a lead-in part 103a for leading in the sheet inserted from the sheet insertion port 104, a bent part 103b bent downward from the lead-in part 103a, and a processing part 103c extending to the discharge port 105 side continuously from the bent part 103b, and sheet forward feed means 106 is disposed in the lead-in part 103a, separating conveying means 107 in the bent part 103b, and sheet conveying means 108, sheet contact type image sensor 109 and sheet discharge means 110 in the processing part 103c, sequentially along the sheet conveying direction K.

Figure 1:
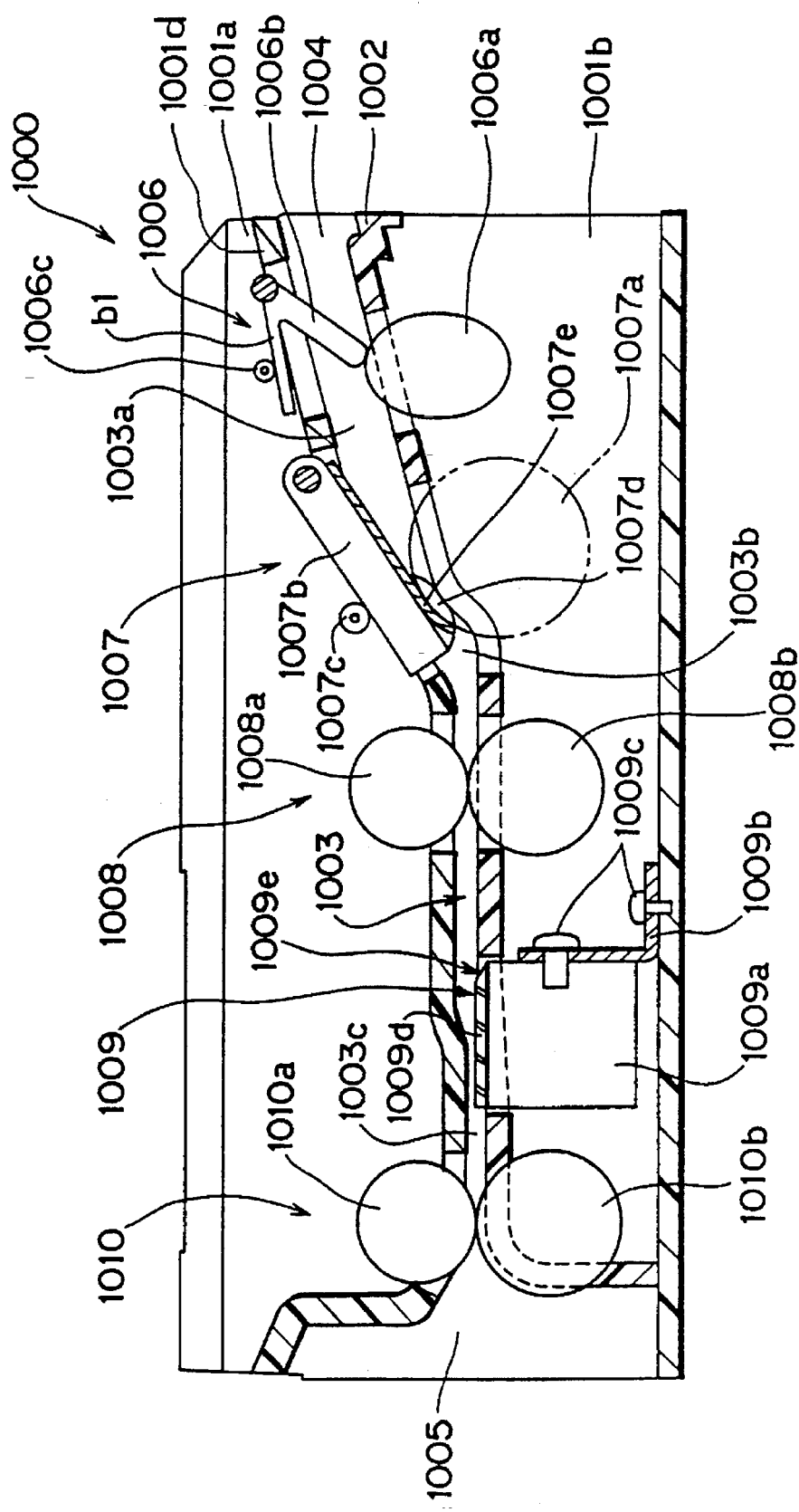
FIG. 1 is a schematic sectional view of an automatic sheet conveying mechanism in the development process of the invention.
Figure 2:
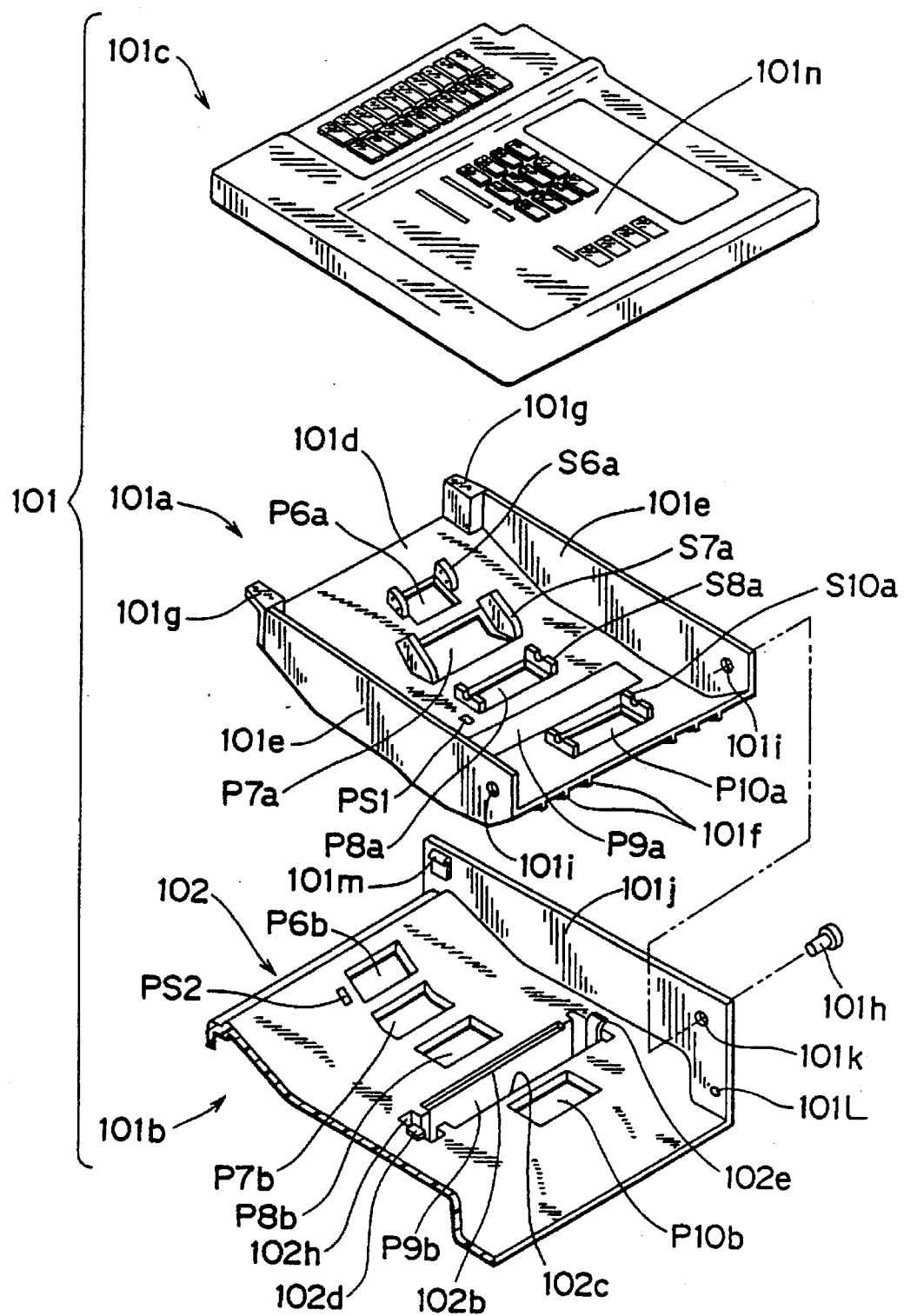
FIG. 2 is a perspective exploded view of a casing of automatic sheet conveying mechanism in an embodiment of the invention.

Referring to FIG. 2, the casing 101 comprises an upper casing 101a for partitioning the upper part of the sheet conveying path 103, a lower casing 101b for supporting the upper casing 101 in a state capable of releasing the sheet conveying path 103, and an outer panel 101c disposed above the upper casing 101a.

Figure 5:
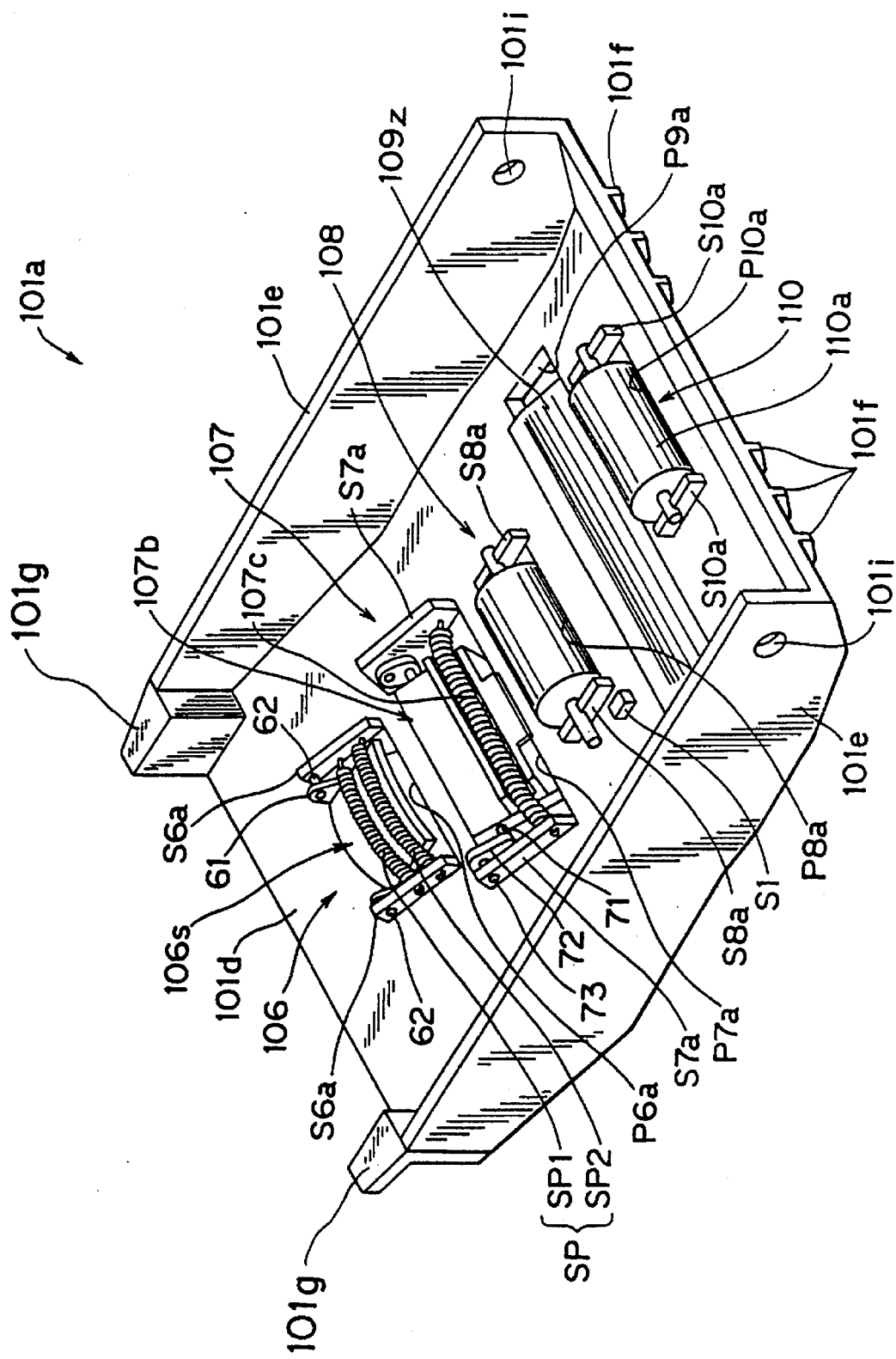
FIG. 5 is a perspective view of an upper casing of automatic sheet conveying mechanism in the embodiment in FIG. 4.

Referring to FIG. 2 and FIG. 5, the upper casing 101a comprises a sheet guide plate 101d made of resin, and a pair of side plates 101e extended at both side of the sheet guide plate 101d.

The sheet guide plate 101d is to partition the upper parts of the sheet conveying path 103, sheet insertion port 104, and sheet discharge port 105 (see FIG. 4), and comprises openings P6a, P7a, P8a, P9a, P10a so that the upper functional parts of the sheet forward feed means 106, separating conveying means 107, sheet conveying means 108, sheet contact type image sensor 109, and sheet discharge means 110 may confront the lower sheet conveying path 103. Besides, near the downstream side of the opening P8 of the sheet conveying means 108, a mounting hole PS1 for mounting the sensor S1 (shown only in FIG. 5) is provided. Moreover, at both ends of the openings P6a, P7a,P8a, and P10a, support members S6a, S7a, S8a, and S10a for detachably supporting the corresponding functional parts are set up. On the back side of the sheet guide plate 101d, to guide the upper surface of the sheet to be conveyed, multiple ribs 101f extending in the sheet conveying direction K extend vertically partially into the paper path.

Each side plate 101e has a hook stopping member 101g at the upstream side of the sheet conveying path 103, and an insertion hole 101i for inserting a pivot bolt 101h at the downstream side.

Figure 6:
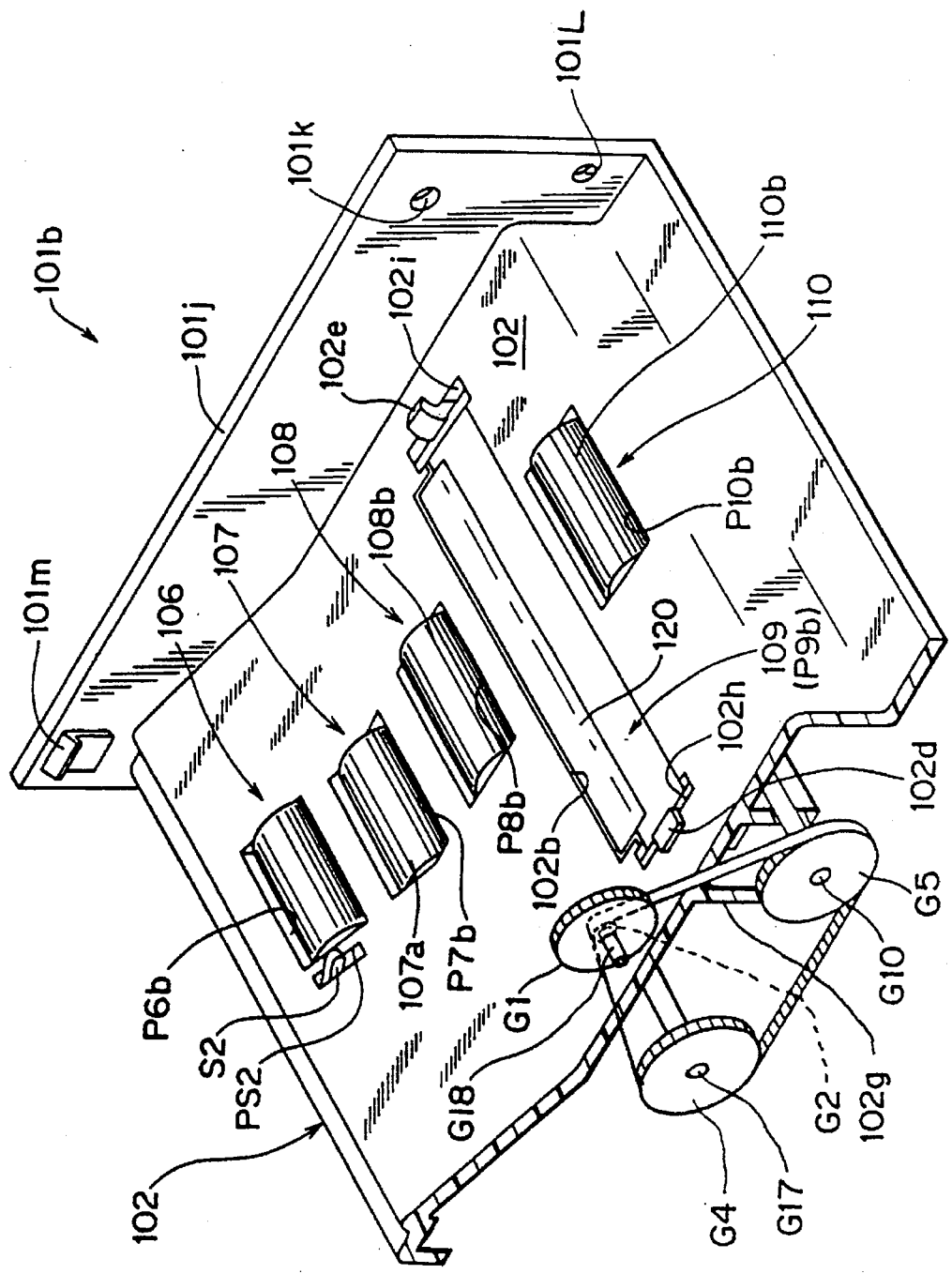
FIG. 6 is a perspective view of a lower casing of automatic sheet conveying mechanism in the embodiment in FIG. 4.

Referring to FIG. 2 and FIG. 6, the lower casing 101b is provided with side plates 101j confronting the side plates 101e of the upper casing 101a from both outer sides, and a bottom plate which is not shown.

The side plate 101j is provided with an insertion hole 101k corresponding to the insertion hole 101i provided in the side plate 101e of the upper casing 101a, and a mounting hole 101L for mounting and dismounting the discharge paper tray 105a (see FIGS. 3, 4) mounted on a sort discharge port 105. The inner side of the upstream side of the sheet conveying direction K of the side plate 101j is fixed by a hook member 101m for stopping the hook stopping member 101g of the upper casing 101a. In the embodiment, therefore, by linking the both casings 101a, 101b by a pivot bolt 101h, and stopping the hook stopping member 101g on the hook member 101m, the casing 101 possessing a sheet conveying path 103 inside and accommodating functional parts projecting into the sheet conveying path 103 inside is composed, whereas by detaching the hook stopping member 101g from the hook member 101m, and rotating the upper casing 101a in the counterclockwise direction in FIG. 4, the sheet conveying path 103 can be released.

The outer panel 101c is disposed above the upper casing 101a and covers the upper casing 101a, and an operation panel 101n electrically connected with a telephone set 12 (see FIG. 13) is formed on its upper surface.

Above the lower casing 101b, there is a sheet guide plate 102 for partitioning the lower parts of the sheet conveying path 103, sheet insertion port 104, and sheet discharge port 105, confronting the ribs 101f of the upper casing 101a, also partitioning the sheet conveying path 103 together with the lower casing 101b and guiding the lower surface of the sheet being conveyed, and defining the projecting extent of the functional parts supported by the lower casing 101b to be mentioned later (forward feed roller 106a, sheet conveying roller 107a, driving roller 108b, contact type image sensor 109, driving roller 110b, etc.) into the sheet conveying path 103.

Thus, the sheet guide plates 101d, 102 in the embodiment are formed integrally with the mutually corresponding upper casing 101a and lower casing 101b known resin forming method. Therefore, in the embodiment, the hitherto effects of assembling precision of the sheet guide plates 101d, 102 and the corresponding upper casing 101a and lower casing 101b can be eliminated, and therefore the positioning precision of the functional parts projecting into the sheet conveying path 103 to the sheet guide plate 102 is determined only by the processing precision in forming the upper casing 101a and lower casing 101b, and the assembling precision of the functional parts in the upper casing 101a and lower casing 101b. Hence, fluctuations of projecting extent of functional parts in the path are decreased. Therefore, according to the embodiment, the projecting extent of the functional parts into the sheet conveying path 103 can be set precisely, thereby preventing occurrence of unusual sound and delay in sheet conveyance. Another advantage is that the number of parts, the number of assembling processes and hence the manufacturing cost can be lowered by forming the sheet guide plates 101d, 102 for partitioning the sheet conveying path 103 integrally with the upper casing 101a and lower casing 101b.

Describing the sheet guide plate 102 in further detail by reference to FIG. 6, this sheet guide plate 102 is provided with openings P6b, P7b, P8b, P9b, P10b for setting the lower side functional parts of the sheet forward feed means 106, separating conveying means 107, sheet conveying means 108, sheet contact type image sensor 109, and sheet discharge means 110 opposite to the sheet conveying path 103 in the upper position. Near the downstream side of the opening P6 of the sheet forward feed means 106, a mounting hole PS2 for mounting a sensor S2 (shown only in FIG. 6) is provided.

Figure 7:
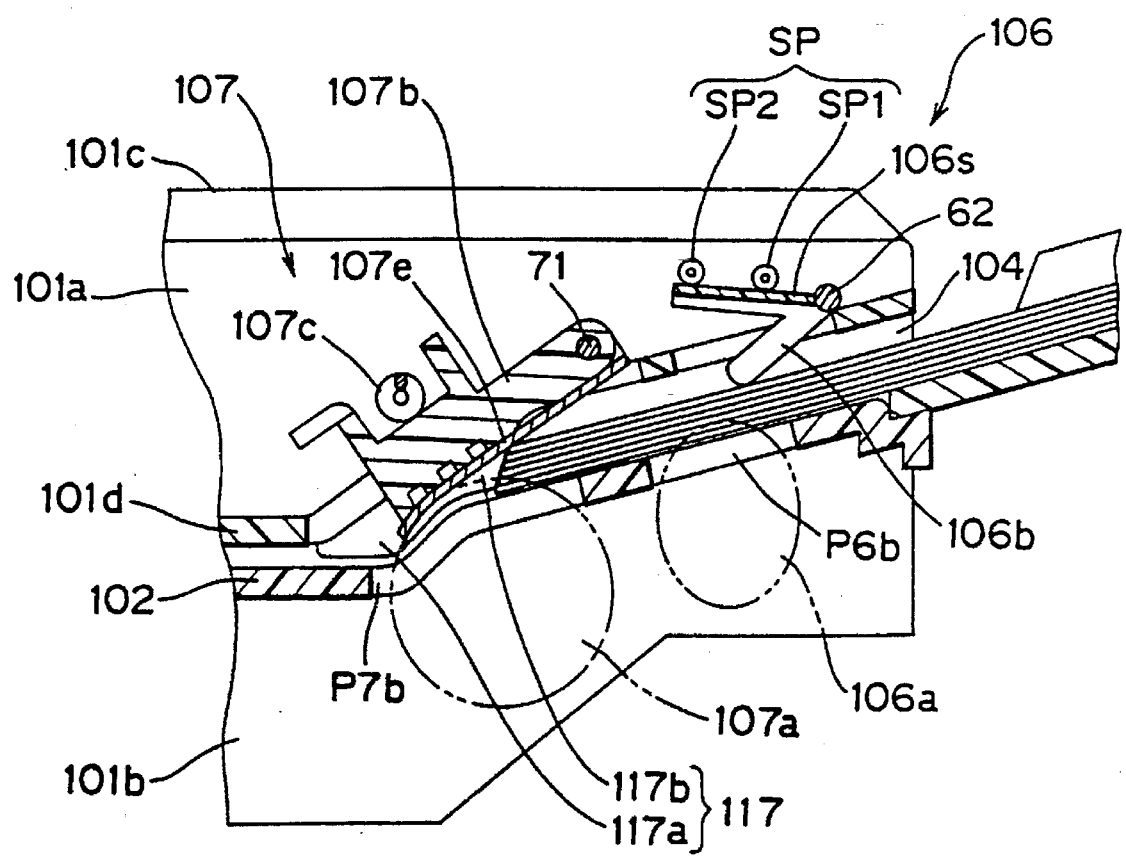
FIG. 7 is a partial magnified sectional view of automatic sheet conveying mechanism in the embodiment in FIG. 4.
Figure 8:
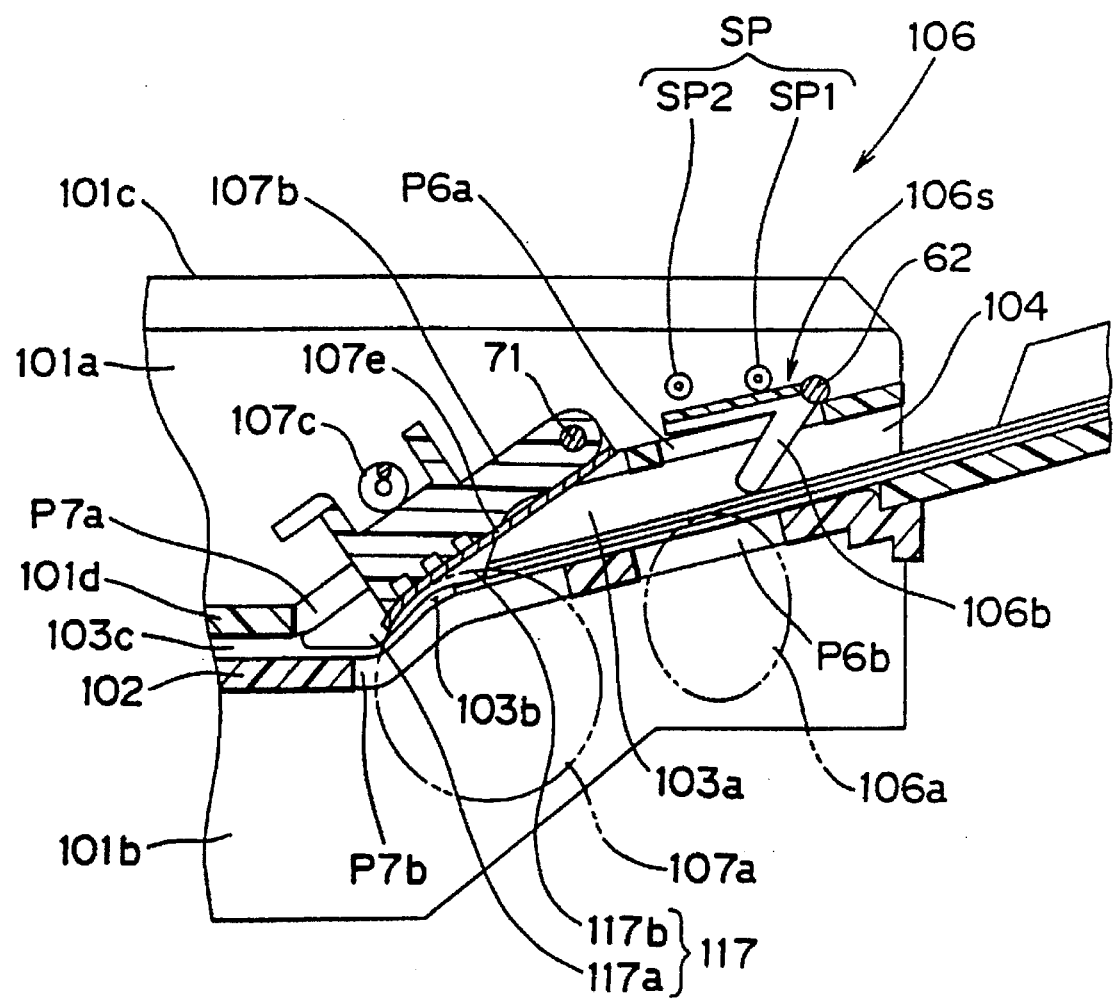
FIG. 8 is a partial magnified sectional view of automatic sheet conveying mechanism in the embodiment in FIG. 4.

By reference to FIG. 7 and FIG. 8, the sheet forward feed means 106 is to feed forward the sheet disposed in the lead-in part 103a of the sheet conveying path 103 to the downstream side, and is provided with a forward feed roller 106a in a non-circular cross section, opposite to the lead-in part 103a of the sheet conveying path 103 from the lower casing 101b. The feed forward. roller 106a is to send the sheet to the downstream side of the, sheet conveying path 103 in the major axis part by rotating in the counterclockwise direction in FIGS. 7 and 8, by a predetermined extent at a predetermined timing.

Above the feed forward roller 106a, a pressing member 106b is confronting, oppositely to the lead-in part 103a of the sheet conveying path 103 from the upper casing 101a, and it is coupled with a support member S6a through arm 61 and pivot 62, being rotatably supported on the upper casing 101a in a state free to move forward and backward in the confronting direction. The pressing member 106b is urged toward the forward feed roller 106a side by spring means SP fixed in the upper casing 101a.

The spring means SP has its both ends fixed in the support member S6a of the upper casing 101a, and is composed of first and second tension coil springs SP1, SP2 extending in the direction approximately orthogonal to the sheet conveying direction K. The first tension coil spring SP1 in the embodiment is always thrusting the pressing member 106b as shown in FIG. 7 and FIG. 8. On the other hand, the second tension coil spring SP2 is fixed at a position for thrusting the pressing member only when the number of sheets fed into the lead-in part 103a of the sheet conveying path 103 is more than a predetermined value (for example, more than 10 sheets). Therefore, according to the embodiment, when only few sheets are conveyed, the pressing member 106b is thrust only by the first tension coil spring SP1, so that a weak thrusting force is obtained. On the other hand, when the held sheets are more than the predetermined number of sheets, the pressing member 106b is thrust by the tension coil springs SP1, SP2 as first and second spring members, so that a strong thrusting force is obtained.

Therefore, in the invention, by varying the specification of the tension coil springs SP1, SP2, a thrusting force depending on the number of sheets may be easily obtained, so that an appropriate forward function may be realized regardless of the number of sheets.

Referring to FIG. 5, the pressing member 106b is provided with a pressure bearing surface 106s in order to stretch the tension coil springs SP1, SP2 in order to receive the thrusting force of the spring means SP. The pressure bearing surface 106s in the embodiment is formed in a curved shape having the middle part of the tension coil springs SP1, SP2 of the spring means in the stretching direction curved in a convex form. Hence, in the invention, regardless of the behavior of the pressing member 106b in the pressing direction, the thrusting force by the tension coil springs SP1, SP2 of the spring means SP may be uniformly distributed over the entire pressure bearing surface 106s, and the sheet pressing force when feeding the sheet forward can be always stabilized, so that a sheet forward feed function of high precision may be realized.

Figure 9:
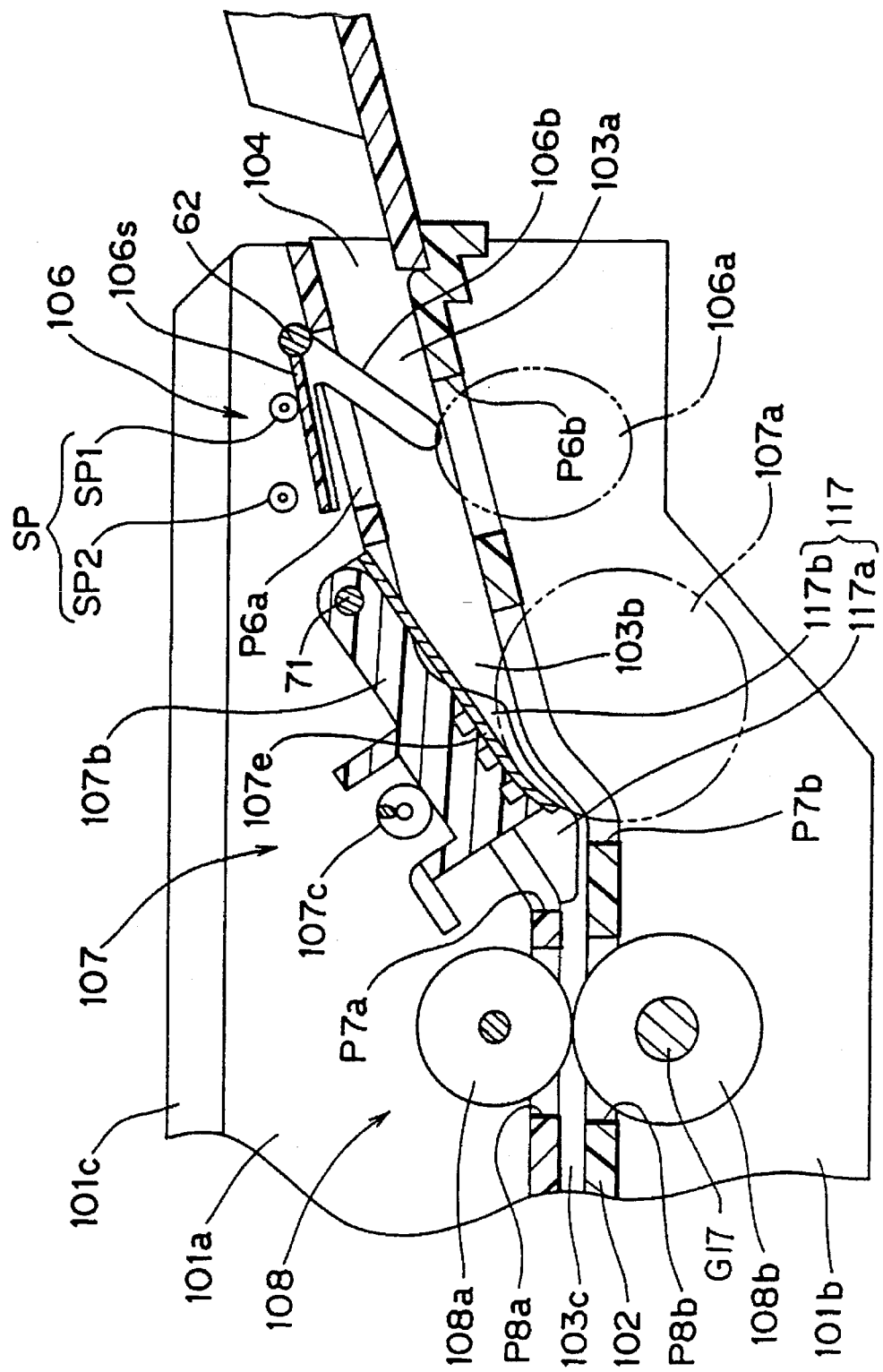
FIG. 9 is a partial magnified sectional view of automatic sheet conveying mechanism in the embodiment in FIG. 4.

Referring now to FIGS. 5, 6 and 9, the separating conveying means 107 is provided with a sheet conveying roller 107a which is mounted on the lower casing 101b. The sheet conveying roller 107a is intended to convey the sheets sent by the sheet forward feed means 106 to the downstream side one by one while separating, and is opposite to the bent part 103b of the sheet conveying path 103 from the sheet guide plate 102 of the lower casing 101b. Above the sheet conveying roller 107a, a separating member 107b projecting to the bent part 103b of the sheet conveying path 103 from the upper casing 101a is confronting, and it is linked with a support member S7a through pivot 71, arm 72 and second pivot 73, being supported to be movable slightly back and forth in the confronting direction. The separating conveying means 107 has a separating part 117 fixed to the sheet guide plate 101d of the upper casing 101a. The separating part 117 projects to the sheet conveying roller 107a so as to separate the sheets one by one to hold the sheets together with the sheet conveying roller 107a, and a plurality thereof are planted vertically at intervals in a direction orthogonal to the sheet conveying direction K.

The separating member 107b has both ends fixed at the supporting member S7a, and is thrust to the sheet conveying roller 107a side by the spring member 107c stretched in a position approximately orthogonal to the sheet conveying direction K. Moreover, the separating member 107b has a pad 107e confronting the sheet conveying roller 107a, being disposed among the separating parts 117, and by the separating parts 117, the end of the sheet fed into the lead-in part 103a is separated so that the upper end may be inclined to the upstream side, and by the thrusting force of the spring member 107c, only the lowermost sheet is held between the pad 107e and sheet conveying roller 107a. In this state, by rotating the sheet conveying roller 107a, only the lowermost sheet from the lead-in part 103a is sent from the bent part 103b to the processing part 103c of the downstream side. Herein, since the separating direction of the separating member 107b in the embodiment is intersecting with the conveying direction by the sheet conveying means 108, duplicate feed is prevented, and only the lowermost sheet can be conveyed easily.

In addition, in the automatic sheet conveying mechanism 100 in the embodiment, the separating parts 117 provided between the sheet conveying means 108 and separating conveying means 107 compose guide means for guiding the sheet so that the separating member 107b may be prevented from being shifted upward from the separating direction by the sheet spread between the sheet conveying means 108 and separating conveying means 107. Therefore, in the embodiment, by the separating means 117, effects of the tension on the separating member 107b when tension occurs on the sheet can be eliminated, and the separating member 107b is prevented from kicking up, so that duplicate feed of sheets due to kick-up of the separating member 107b may be prevented. As the guide means, meanwhile, a protrusion for guide 111 separately disposed at the downstream side of the separating parts 117 may be commonly used as shown in FIG. 10.

The separating part 117 of the separating conveying means 107 in the embodiment comprises a main separating part 117a for separating a plurality of sheets into one in collaboration with the sheet conveying roller 107a, projecting to the downstream side of the bent part 103b, and a subsidiary separating part 117b for limiting the number of sheets supplied to the main separating part 117a, being disposed at the upstream side of the main separating part 117a. According to the embodiment, therefore, the sheets fed into the lead-in part 103a of the sheet conveying path 103 is first limited to a predetermined number of sheets by the subsidiary separating part 117b at the upstream side of the bent part 103b, and then conveyed one by one to the downstream side by the main separating part 117a at the downstream side of the bent part 103b, so that defective conveyance and duplicate feed in the separating conveying means 107 may be securely prevented.

Figure 10:
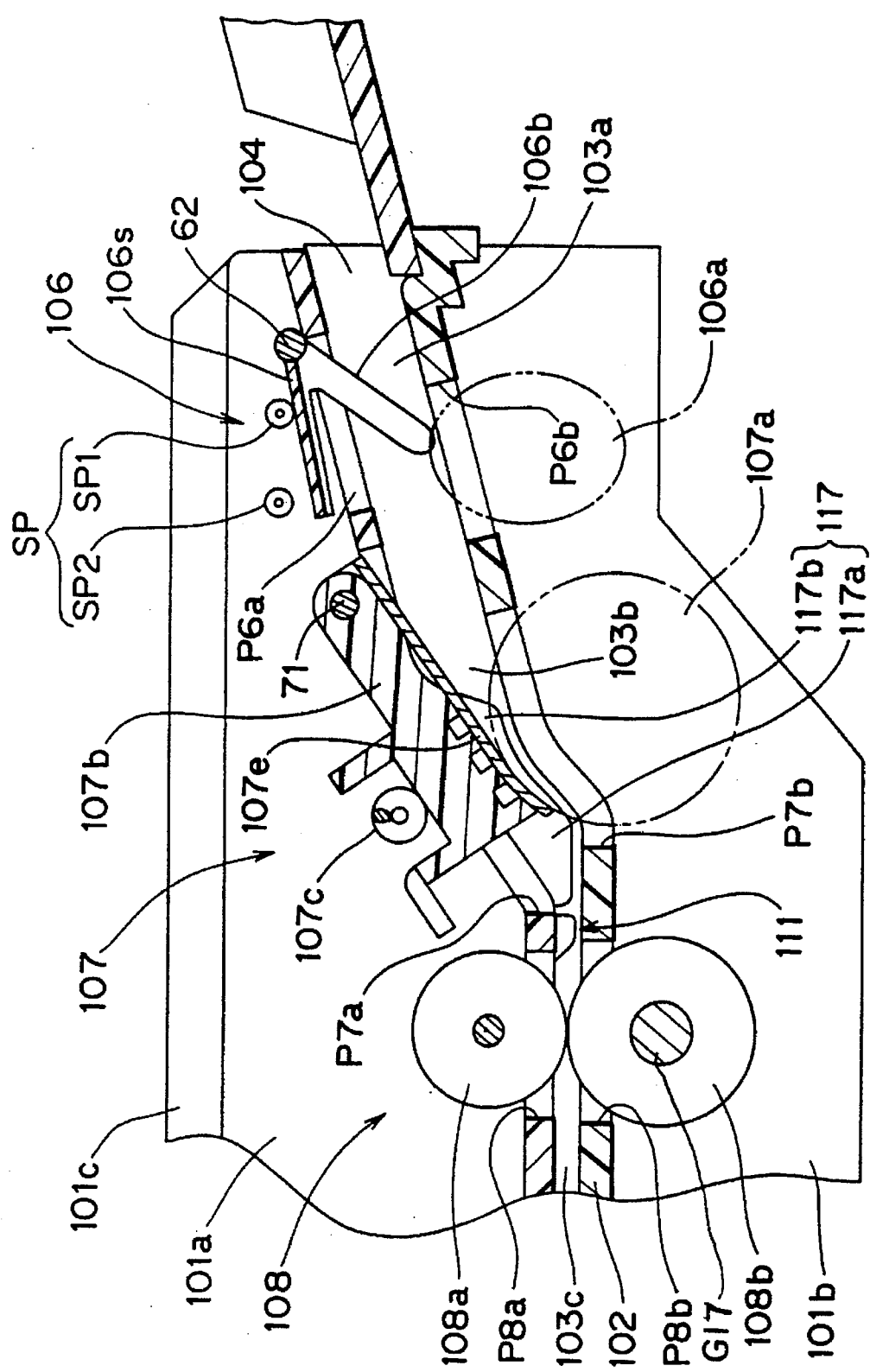
FIG. 10 is a partial magnified sectional view of automatic sheet conveying mechanism in other embodiment of the invention.

Referring to FIG. 9 and FIG. 10, the sheet conveying means 108 is to convey the sheets separately one by one by the separating conveying means 107 into the image contact type image sensor 109 side, and comprises a driven roller 108a pivoted on the support member S9a of the upper casing 101a and a driving roller 108b disposed in the lower casing 101b. The driving roller 108b is composed to drive at the sheet conveying speed faster than the sheet conveying speed of the separating conveying means 107, so that joint conveyance of sheets is prevented same as in the prior art.

Figure 11:
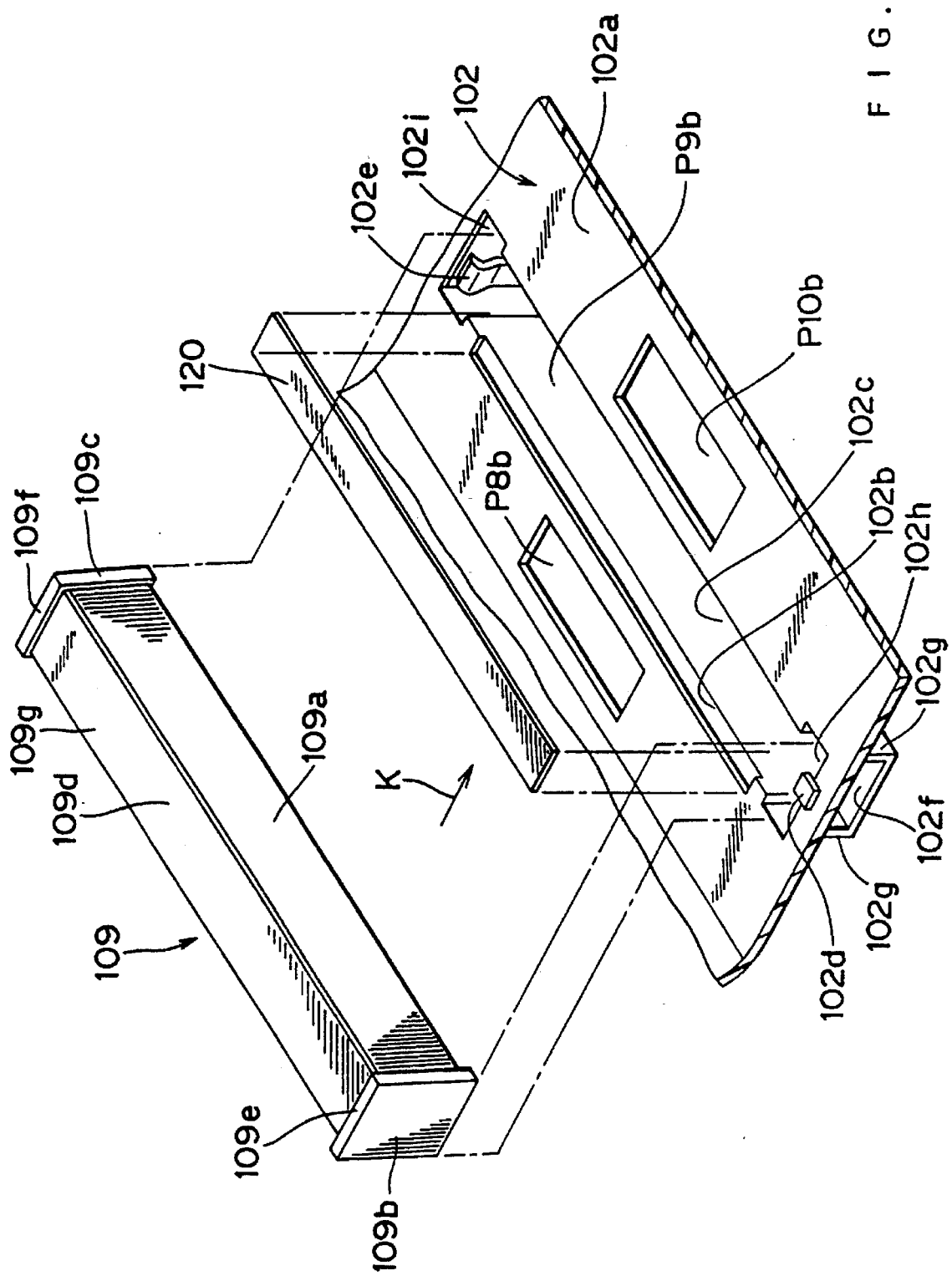
FIG. 11 is a partial exploded view showing essential parts of a contact type image sensor of automatic sheet conveying mechanism in FIG. 4.

Referring next to FIG. 11, the contact type image sensor as processing means is to separate and scan the image which is the two-dimensional information of the conveyed sheets by every pixel, end is incorporated in the accommodating part 102c having a free space for storing the contact type image sensor 109 through an opening P9b of the sheet guide plate 102. This accommodating part 102c is partitioned by the U-shape section composed of a bottom 102f and a pair of side walls 102g, formed integrally with the sheet guide plate 102. In the drawing, arrow K indicates the sheet conveying direction.

The image sensor 109 comprises an image sensor main body 109a of long parallelopiped, a pair of plate-form fixing parts 109b, 109c placed at both sides of the image sensor main body 109a in the longitudinal direction, and a plate-form contact glass 109d fixed to the upper surface of the image sensor main body 109a and contacting with the lower surface of the sheet. The sectional shape of the fixing parts 109b, 109c is slightly larger than the sectional shape of the image sensor main body 109a.

Figure 13:
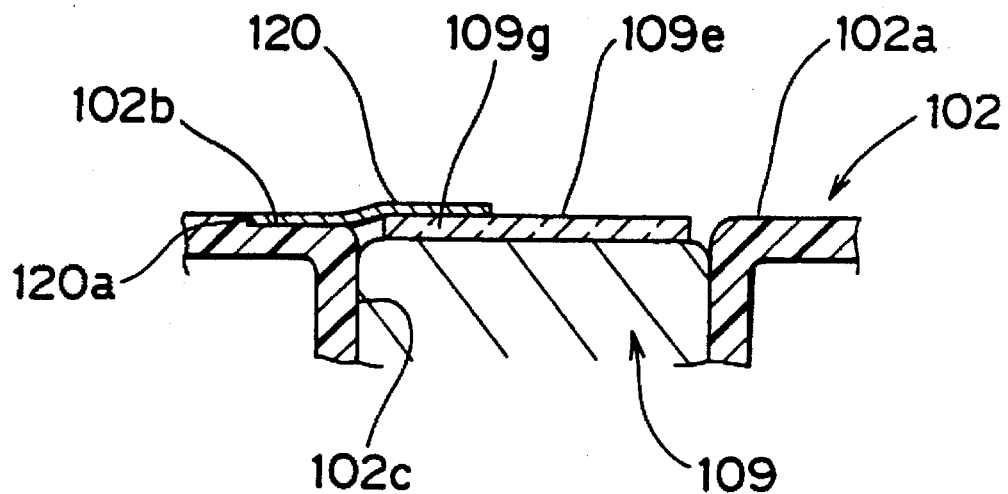
FIG. 13 is partial magnified view showing a fixing structure of Lumilar employed in a contact type image sensor of automatic sheet conveying mechanism in FIG. 4.

At the edge of the upstream side of the conveying direction K of the opening P9b, a rectangular recess 102b is formed as shown in FIG. 11, and a thin plate preferably made of Lumilar 120 is mounted within the recess 102b as shown in FIG. 13. The Lumilar 120, in order to avoid collision of the sheet against the upper edge of the upstream side of the contact glass 109d of the image sensor 109 in the conveying direction, guides the sheet from the upstream side of the image sensor 109 in the conveying direction to the upper surface of the contact glass 109d, in the state of straddling over the upstream side part 109g in the conveying direction of the upper end face of the contact glass 109d and the recess 102b. Fixing of the Lumilar 120 in the recess 102b is defined at a height capable of avoiding collision of the sheet with the edge 120a of the upstream side in the conveying direction of the Lumilar 120 itself (in this case, the same height).

Thus, since the Lumilar 120 for preventing collision of the sheet against the contact glass 109d of the image sensor 109 is fixed to the sheet guide plate 102 side, only the image sensor 109 can be replaced by folding upward the Lumilar 120. Therefore, the maintenance work of the image sensor 109 is facilitated. Moreover, unlike the case of obliquely cutting the end surface of the contact glass 109d, the manufacturing cost is not raised. Besides, as compared with the case of replacing the image sensor 109 and Lumilar 120 simultaneously as the Lumilar 120 is glued to the image sensor 109, the maintenance cost may be lowered.

Making reference to FIG. 11, the size of the opening P9b is set to such a size as to be capable of putting the image sensor 109 in and out of the accommodating part 102c from above the sheet guide plate 102 through the opening P9b. Seeing the opening P9b and accommodating part 102c from above, the parts 102h, 102i (both end parts in the longitudinal direction) passing through or accommodating the fixing parts 109b, 109c at both ends of the image sensor 109 are approximately matched with the width of the fixing parts 109b, 109c, and are set wider than the other parts. Hence, the image sensor 109 accommodated in the accommodating part 102c may be positioned in the width-wise direction.

Figure 14:
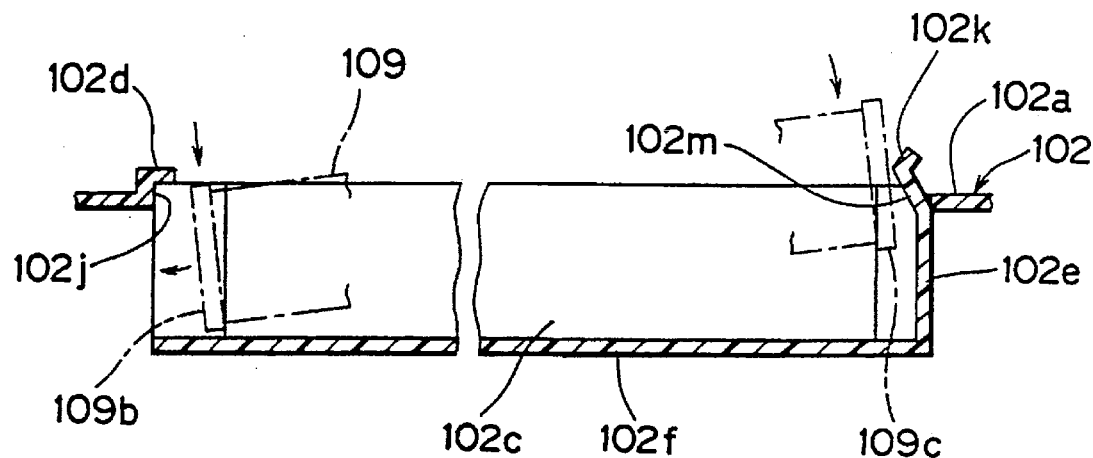
FIG. 14 is a schematic sectional view showing a mounting procedure of the contact type image sensor in FIG. 13.
Figure 15:
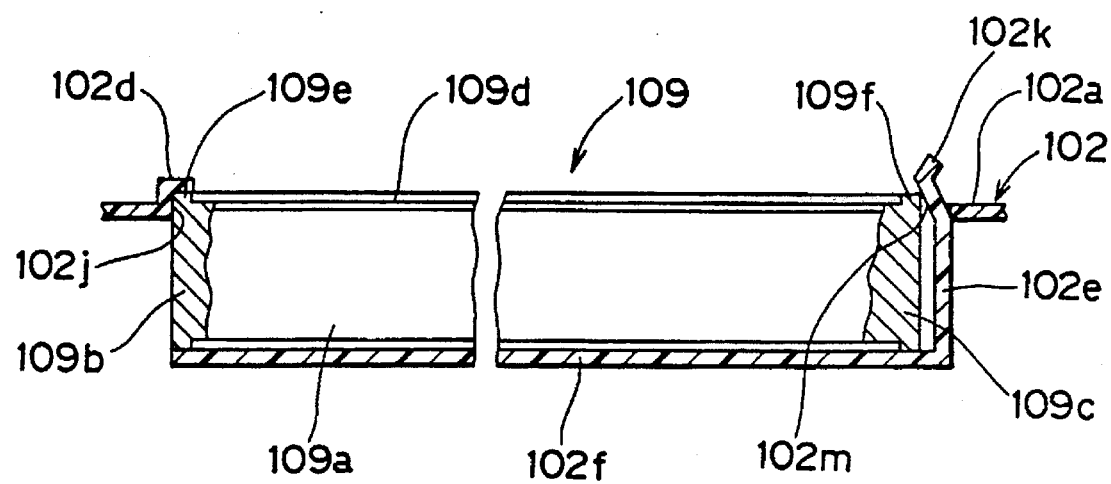
FIG. 15 is a schematic sectional view showing a mounting procedure of the contact type image sensor in FIG. 13.

At both ends in the longitudinal direction of the opening P9b, a stiff piece 102d and an elastic piece 102e are disposed as a pair of locking means for locking the image sensor 109 accommodated in the accommodating part 102c through the opening P9b in the state of being positioned in the heightwise direction and longitudinal direction as shown in FIG. 14 and FIG. 15. The stiff piece 102d is a flat tongue formed integrally on the upper surface 102a of the sheet guide plate 102, and is projecting upward of the opening P9b from the opening edge. At the position of the stiff piece 102d opposite to the accommodating part 102c, a step 102j is formed so as to abut against the upper edge 109e of the fixing part 109b of the image sensor 109 incorporated in the accommodating part 102c, thereby positioning it in the longitudinal direction and heightwise direction.

Figure 12:
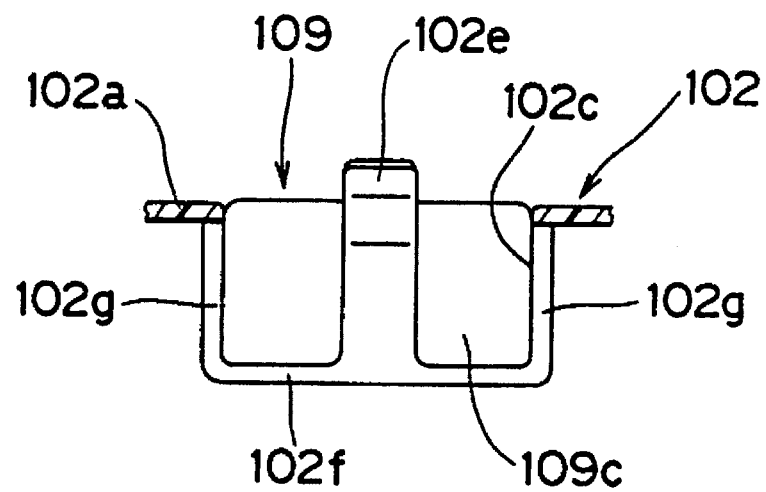
FIG. 12 a side view showing a fixing structure of a contact type image sensor of automatic sheet conveying mechanism in FIG. 4.

Referring to FIG. 12 and FIG. 14, the elastic piece 102e is formed integrally so as to rise above from the bottom 102f of the accommodating part 102c, and is designed to be bent elastically along the longitudinal direction of the accommodating part 102c, around the lower end part. At the upper end of the elastic piece 102e, a finger hook 102k is provided, being inclined outward, so as to defect the elastic piece 102e outward (in the unlocking direction). The elastic piece 102e also has an engaging part 102m continuous to the lower part of the finger hook 102k and inclined reversely to the finger hook 102k. This engaging part 102m is engaged with the upper edge 109f of the fixing part 109c of the accommodated image sensor 109.

The elastic repulsive force of the elastic piece 102e acts as the force to push the fixing part 109c of the image sensor 109 both in the longitudinal direction and in the downward direction through the inclined engaging part 102m. The downward force acts to press the fixing part 109c against the bottom 102f, so that the fixing part 109c is positioned in the heightwise direction, and this positioning is maintained. The force in the longitudinal direction acts to press the fixing part 109b of the image sensor 109 to the step 102j of the stiff piece 109, so that the image sensor 109 is positioned in the longitudinal direction, and this positioning is maintained.

When putting the image sensor 109 into the accommodating part 102c through the opening P9b, the fixing part 109b is concealed beneath the stiff piece 102e, in the state of the image sensor 109 being inclined so that one fixing part 109b side may be lower, while the other fixing part 109c is moved along the finger hook 102k of the elastic piece 102e, and the fixing part 109c is pushed down until abutting against the bottom 102f, while deforming the elastic piece 102e outward. The image sensor 109 is locked by the stiff piece 102d and elastic piece 102e as mentioned above. When taking out the image sensor 109 out of the accommodating part 102c, the elastic piece 102e is pushed open to unlock, thereby taking out in the reverse process of accommodation.

Thus, the image sensor 109 is pushed in and out of the accommodating part 102c through the opening P9b from above the sheet guide plate 102, so that the image sensor 109 may be mounted or dismounted without detaching the sheet guide plate 102. Therefore, the maintenance work of the image sensor 109 is easy. In addition, since the image sensor 109 put in the accommodating part 102c can be locked at predetermined position, the mounting precision is excellent in spite of easy detaching and attaching.

As shown in FIG. 5, at the base end 101d of the upper casing 101a, incidentally, a pressing plate 109z projecting into the sheet conveying path 103 partly from the opening P9a is fixed, and by this pressing plate 109z, the sheet is pressed against the contact glass 109d of the image sensor 109.

Figure 16:
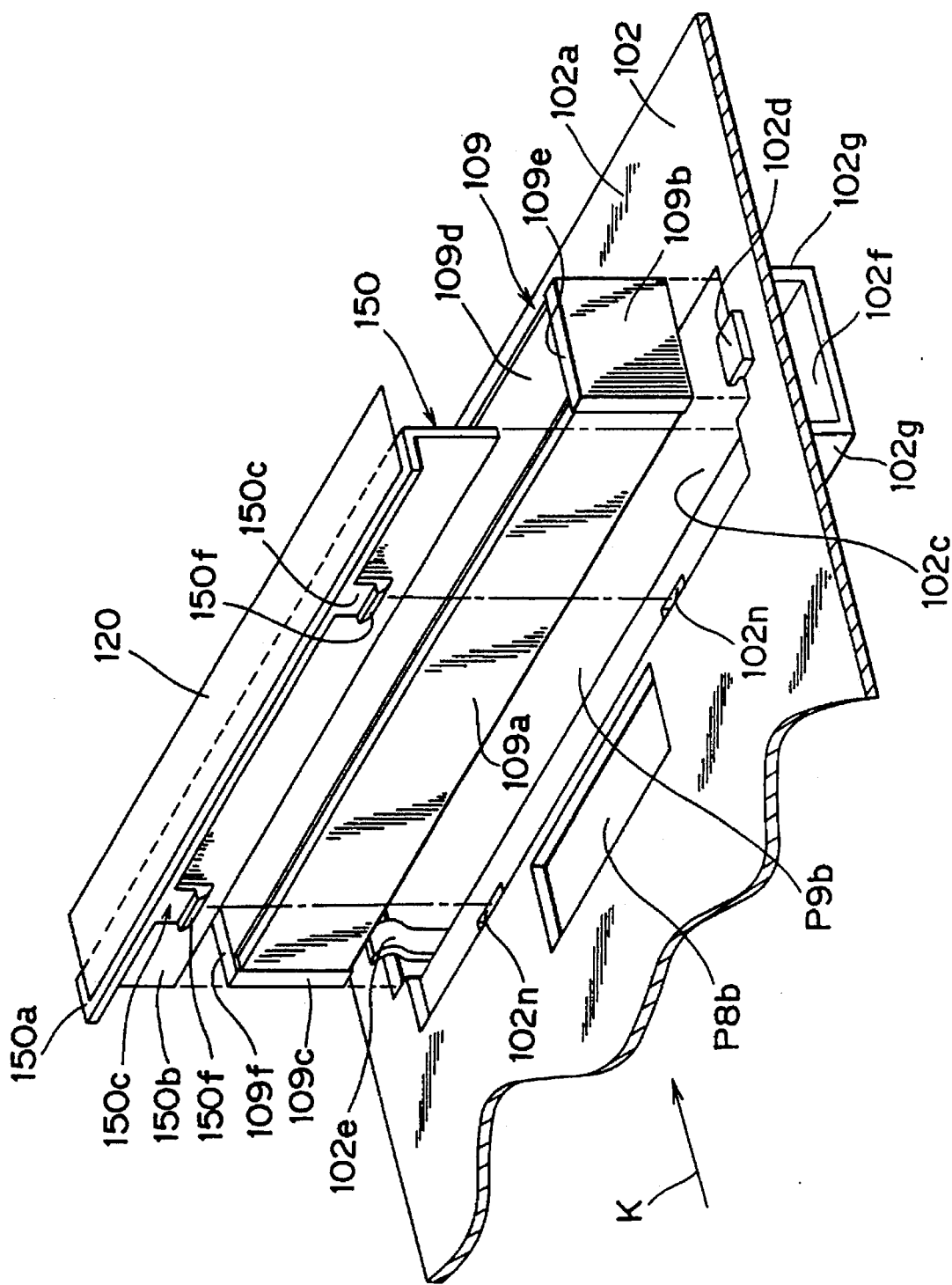
FIG. 16 is a perspective exploded view showing essential parts of an automatic sheet conveying mechanism in a different embodiment of the invention.

Referring to FIG. 16, at both ends of the opening P9b in the longitudinal direction, the still piece 102d and elastic piece 102e are disposed as a pair of locking means for locking the image sensor 109 put in the accommodating part 102b through the opening P9b, in the state positioned in the heightwise direction and longitudinal direction. The stiff piece 102d is engaged with an upper edge 109e of the fixing part 109b of the image sensor, while the elastic piece 102e is engaged with an upper edge 109f of the fixing part 109c.

When putting the image sensor 109 into the accommodating part 102c through the opening P9b, the fixing part 109b is concealed beneath the stiff piece 102e, in the state of the image sensor 109 being inclined so that one fixing part 109b side may be lower, while the other fixing part 109c is moved along the finger hook 102k of the elastic piece 102e, and the fixing part 109c is pushed down until abutting against the bottom 102f, while deforming the elastic piece 102e outward. The image sensor 109 is locked by the stiff piece 102d and elastic piece 102e as mentioned above. When taking out the image sensor 109 out of the accommodating part 102c, the elastic piece 102e is pushed open to unlock, thereby taking out in the reverse process of accommodation.

What is characteristic of the embodiment is that, aside from the fact that the image sensor 109 is detachably put in the accommodating part 102 through the opening P9b, the Lumilar 120 for avoiding collision of the sheet against the upper edge of the upstream side in the conveying direction of the contact glass 109d of the image sensor 109 is fitted on a fixing member 150, with the fixing member 150 being detachably fitted to the sheet guide plate 102c.

Figure 17:
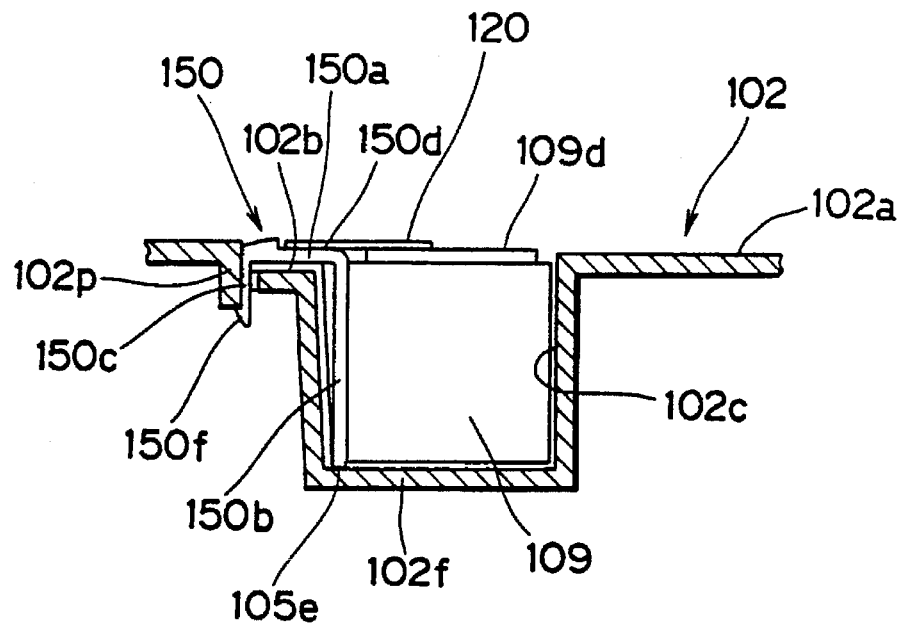
FIG. 17 is a schematic sectional view showing the mounting state of image sensor and Lumilar in the embodiment in FIG. 16.
Figure 18:
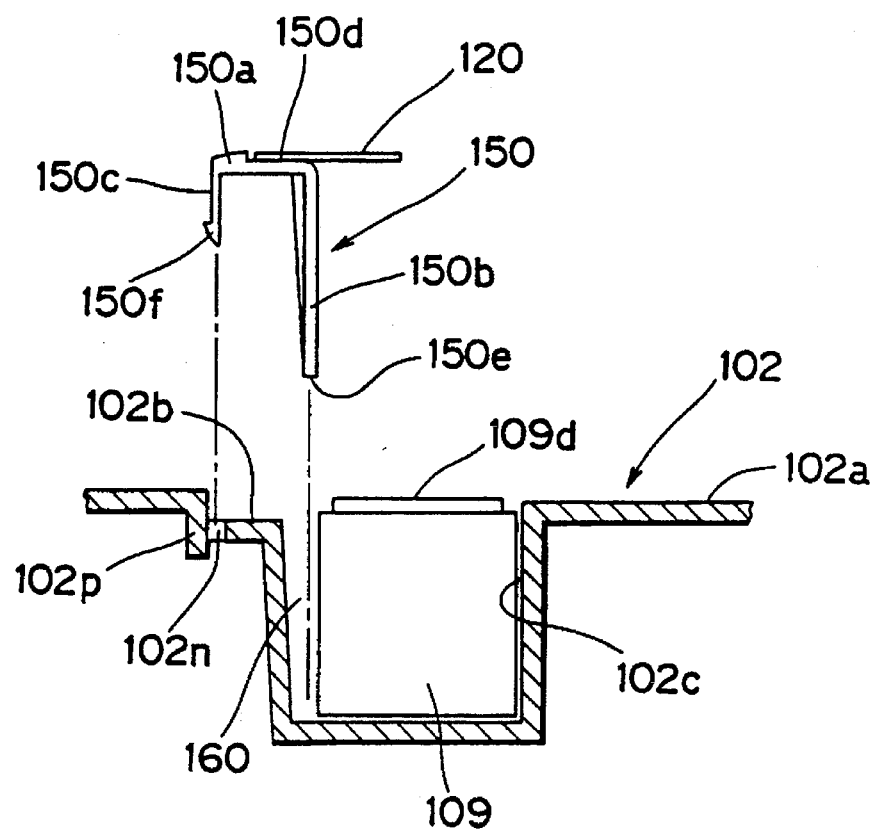
FIG. 18 is a schematic sectional view showing the state of dismounting of Lumilar in the embodiment in FIG. 16.

Referring to FIG. 16 through FIG. 18, the fixing member 150 is made of an angle material in an inverted L-shaped section, comprising an upper surface 150a, a vertical part 150b, and a pair of lock parts 150c. The upper surface 150a possesses a recess 150d to which the Lumilar 120 is adhered, and the fixing member 150 is put into the accommodating part 102c of the sheet guide plate 102, in a state being mounted on the sheet guide plate 120.

The vertical part 150b is extended downward from one edge of the upper surface 150a, and is inserted into the accommodating part 102c together with the image sensor 109. With the vertical part 150b put in the accommodating part 102c together with the image sensor 109, the lower end 105d of the vertical part 150b abuts against the bottom 102f of the accommodating part 102c, and the fixing member 150 is positioned in the heightwise direction by the bottom 102f. As a result, the Lumilar 120 is positioned at a predetermined height along the upper surface of the contact glass 109d of the image sensor 109 (see FIG. 17).

The lock part 150c comprises an elastic piece extended downward from the other edge of the upper surface 150a, and possesses an arrowhead part 150f at the lower end. This lock part 150c penetrates through a penetration hole 102n provided in the accommodating part 102 of the sheet guide plate 102, and by hooking the arrowhead part 150f on the lower end of the rib 102p of the sheet guide 102, the mounting state of the fixing member 150 on the sheet guide plate 102 is elastically locked.

According to the embodiment, only the image sensor 109 can be replaced without removing the Lumilar 120 for preventing collision of the sheet against the contact glass 109d of the image sensor 109. Therefore, the maintenance work of the image sensor 109 is easy. At the same time, unlike the case of cutting the end face of the contact glass obliquely, the manufacturing cost is not raised. Still more, the maintenance cost is lower as compared with the case of replacing the image sensor and Lumilar simultaneously as the Lumilar is adhered to the image sensor.

Yet, since the image sensor can be detached or attached without dismounting the sheet guide plate, the maintenance of the image sensor is much easier. Further, as shown in FIG. 18, with the fixing member 150 detached from the sheet guide plate 102, since a free space 160 adjacent to the image sensor 109 is formed in the accommodating part 102c, the image sensor 109 may be freely moved within the accommodating part 102c, so that the maintenance work of the image sensor 109 may be much easier.

In addition, sine the image sensor 109 put in the accommodating part 102c can be locked at a predetermined position by the stiff piece 102d and elastic piece 102e, the mounting precision is high in spite of easy detaching or attaching.

In the embodiment, since the image sensor 109 is mounted on the sheet guide plate 102, the positioning precision of the image sensor 109 on the sheet guide plate 102 is extremely excellent.

Particularly in the embodiment, the upper casing 101a integrally possesses a sheet guide plate 101d for partitioning above the sheet conveying path 103 and guiding the upper surface of the conveyed sheet, and also comprises an outer panel 101c capable of opening the upper surface of the sheet guide plate 101d, and the pressing member 106b of the forward feed means 106 is opposite to the outer panel 101c side through the opening P6a formed in the sheet guide plate 101d, and tension coil springs SP1, SP2 of the forward feed means 106 are mounted on the support member S6a fixed on the upper surface of the sheet guide plate 101d, the separating conveying means 107 comprises a separating member 107b for separating the sheets being opposite to the outer panel 101c side through the opening P7a formed in the sheet guide plate 101c, and a spring member 107c for thrusting the separating member 107b in the sheet separating direction being mounted on the upper surface of the sheet guide plate 101d, and therefore by detaching the outer panel 107c from the upper casing 101a, the pressing member 106b of the forward feed means 106, tension coil springs SP1, SP2, and separating member 107b and spring member 107c of the separating conveying means 107 are opened, so that maintenance and tuning jobs may be done easily.

Referring then to FIG. 5 and FIG. 6, at the downstream end of the sheet guide plate 102, the sheet discharge means 110 for conveying the sheet to the discharge paper tray 105a is disposed. The sheet discharge means 110 is, same as in the prior art, for discharging the sheet being read and processed by the contact type image sensor 109a into the discharge tray 105a of the sheet discharge port 105, being composed of a driven roller 110a pivoted on the support member S10a of the upper casing 101a, and a driving roller 110b mounted on the lower casing 101b.

The driving mechanism of the automatic sheet conveying mechanism 100 is composed of a pulley mechanism G (see FIG. 6) interlocked by the driving mechanism (not shown) of the facsimile apparatus 10.

Referring to FIG. 6, the pulley mechanism G comprises an input gear G1 coupled to the driving mechanism not shown herein, a small end pulley G2 disposed concentrically and integrally with the coupling gear G1, a belt G3 wound on the small end pulley G2, and coupling pulleys G4, G5 driven by the belt G3. The small end pulley G2 is rotatably mounted on a pin G18 set up on the side plate 101j of the lower casing 101b. The coupling pulley G4 is fixed to the end of the G17 of the driving roller 108b of the sheet conveying means 108. The coupling pulley G5 is fixed to the end of a rotary shaft G10 of the driving roller 110b of the sheet discharge means 110. Though not shown in the drawings specifically, the driving roller 108b of the sheet conveying means 108, sheet conveying roller 107a, and feed forward roller 106a are composed in interlock through belt mechanism. Therefore, when the coupling gear G1 is driven by the driving mechanism of the facsimile 10 and the small end pulley G2 is put into rotation, the coupling pulleys G4, G5 are rotated and driven through the belt G3, so that the rollers 107a, 108a, 110b are rotated and driven in the same direction, and the sheet conveying roller 107a and feed forward roller 106a are rotated and driven through the belt mechanism.

The invention may also be executed in other various forms without departing from the true spirit and main features thereof. Hence, the illustrated embodiments are mere examples in all respects, and should not be interpreted limitatively. The scope of the invention is shown in claims, and is not restricted whatsoever by the description in the Specification. All changes and modifications belonging to the uniform scope of the claims herein are also entirely included in the scope of the invention.

What is claimed is:

1. An automatic sheet conveying mechanism comprising:

a sheet guide plate having an opening that provides for penetration of a long contact type image sensor that scans lower surface of a document conveyed in a sheet conveying path, said sheet guide plate guiding said lower surface of said document, and said sheet guide plate being integrally formed with an accommodating part for accommodating the image sensor by supporting the image sensor in a predetermined position, said opening being an opening said accommodating part and having a size to put the image sensor in and take the image sensor out of said accommodating part, from above said sheet guide plate a pivot bolt for pivotally coupling an upper casing with one end in a sheet conveying direction of a lower casing adapted to be mutually rotatable;

a hook member disposed at the other end in the sheet conveying direction of either of said upper and lower casings; and a hook stopping member disposed at the other end in the sheet conveying direction of the other of said upper and lower casings for detachably stopping said hook member.

2. An automatic sheet conveying mechanism comprising:

a sheet guide plate having an opening that provides for penetration of a long contact type image sensor that scans a lower surface of a document conveyed in a sheet conveying path, said sheet guide plate guiding said lower surface of said document, and said sheet guide plate being integrally formed with an accommodating part for accommodating the image sensor by supporting the image sensor in a predetermined position, said opening being an opening to said accommodating part and having a size to put the image sensor in and take the image sensor out of said accommodating part, from above said sheet guide plate wherein said sheet guide plate is integrally provided with a pair of lock means for locking the image sensor in a predetermined position by respectively engaging with upper edges at opposite ends in a longitudinal direction of the image sensor supported at a predetermined position by said accommodating part, and at least one of said lock means is an elastic piece adapted to be unlocked by elastically deforming when the image sensor is put in and when the image sensor is taken out.

3. An automatic sheet conveying mechanism of claim 2, wherein at least one of said lock means is provided with an engaging part having a slope for applying elastic force of said elastic piece to an upper edge of the image sensor so that the image sensor is pressed in the state of being positioned in end and bottom walls in said accommodating part.

4. An automatic sheet conveying mechanism of claim 2, wherein the other lock means is a stiff piece for positioning the image sensor in a heightwise direction by projecting above said opening from an opening edge of said accommodating part.

5. An automatic sheet conveying mechanism of claim 2, wherein said lock means is provided with a finger hook extended from a free end of said elastic piece for deflecting said elastic piece in a direction so that said elastic piece unlocks the image sensor.

* * * * *